US011699146B2

(12) United States Patent
Belleville et al.

(10) Patent No.: US 11,699,146 B2
(45) Date of Patent: Jul. 11, 2023

(54) UPDATING DIGITAL WALLET ASSETS

(71) Applicant: Airship Group, Inc., Portland, OR (US)

(72) Inventors: Michael Belleville, San Ramon, CA (US); Joe Beninato, Mountain View, CA (US); Echeyde Cubillo, Foster City, CA (US); Erik A. Onnen, Portland, OR (US)

(73) Assignee: Airship Group, Inc., Portland, OR (US)

( * ) Notice: Subject to any disclaimer, the term of this patent is extended or adjusted under 35 U.S.C. 154(b) by 0 days.

(21) Appl. No.: 17/581,413

(22) Filed: Jan. 21, 2022

(65) Prior Publication Data

US 2022/0147976 A1    May 12, 2022

Related U.S. Application Data

(63) Continuation of application No. 16/983,902, filed on Aug. 3, 2020, now Pat. No. 11,250,418, which is a continuation of application No. 16/178,134, filed on Nov. 1, 2018, now Pat. No. 10,755,266, which is a continuation of application No. 14/621,302, filed on Feb. 12, 2015, now Pat. No. 10,121,141.

(60) Provisional application No. 62/017,209, filed on Jun. 25, 2014.

(51) Int. Cl.
*G06Q 20/36* (2012.01)

(52) U.S. Cl.
CPC ............... *G06Q 20/3672* (2013.01)

(58) Field of Classification Search
USPC ........................................... 705/41
See application file for complete search history.

(56) References Cited

U.S. PATENT DOCUMENTS

| | | | |
|---|---|---|---|
| 6,862,575 B1 | 3/2005 | Anttila et al. | |
| 7,392,226 B1 * | 6/2008 | Sasaki | G06Q 20/382 |
| | | | 705/64 |
| 8,150,731 B1 | 4/2012 | Whitten et al. | |
| 8,458,024 B1 | 6/2013 | Compain et al. | |
| 8,700,250 B1 | 4/2014 | Curtis et al. | |
| 9,686,386 B1 * | 6/2017 | Kubasik | H04M 1/72457 |
| 2004/0181531 A1 | 9/2004 | Becker | |

(Continued)

FOREIGN PATENT DOCUMENTS

AU     2006200653     3/2006

OTHER PUBLICATIONS

NFC Smart Tourist Card Combining Mobile and Contactless Technologies towards a Smart Tourist Experience Basili (Year: 2014).*

(Continued)

*Primary Examiner* — William E Rankins
(74) *Attorney, Agent, or Firm* — Fenwick & West LLP

(57) ABSTRACT

A system for updating a digital wallet installation is disclosed. Event information is received. The received event information is evaluated against a set of rules. A digital wallet asset logical instance to be updated is identified based at least in part on the evaluation. The identified instance is updated. An installation of a digital wallet asset associated with the identified instance is identified. An update instruction is provided to a device associated with the installation.

20 Claims, 10 Drawing Sheets

(56) References Cited

U.S. PATENT DOCUMENTS

| | | | |
|---|---|---|---|
| 2005/0240484 A1* | 10/2005 | Yan | G07B 15/00 455/411 |
| 2008/0215383 A1 | 9/2008 | Sundt et al. | |
| 2009/0008439 A1 | 1/2009 | Kubler et al. | |
| 2009/0125429 A1* | 5/2009 | Takayama | G06Q 20/327 705/35 |
| 2009/0288012 A1 | 11/2009 | Hertel et al. | |
| 2010/0100591 A1 | 4/2010 | Mahaffey et al. | |
| 2011/0035287 A1* | 2/2011 | Fox | G06Q 30/02 705/26.1 |
| 2013/0054368 A1 | 2/2013 | Grigg et al. | |
| 2013/0096961 A1 | 4/2013 | Owens et al. | |
| 2013/0226792 A1 | 8/2013 | Kushevsky et al. | |
| 2013/0226816 A1 | 8/2013 | Chory et al. | |
| 2013/0275307 A1* | 10/2013 | Khan | H04W 12/068 705/64 |
| 2013/0325567 A1* | 12/2013 | Bradley | G06Q 30/02 705/14.1 |
| 2013/0346302 A1 | 12/2013 | Purves et al. | |
| 2014/0019352 A1 | 1/2014 | Shrivastava | |
| 2014/0136349 A1* | 5/2014 | Dave | G06Q 20/12 705/16 |
| 2014/0257747 A1 | 9/2014 | Repenning et al. | |
| 2014/0372154 A1* | 12/2014 | Scott | G06Q 50/30 705/5 |
| 2015/0065107 A1 | 3/2015 | Dave et al. | |
| 2015/0074774 A1* | 3/2015 | Nema | H04L 63/062 726/5 |
| 2016/0012465 A1 | 1/2016 | Sharp | |
| 2016/0080913 A1 | 3/2016 | Thogersen | |
| 2016/0253599 A1 | 9/2016 | Lang et al. | |
| 2019/0387031 A1 | 12/2019 | Steinbach et al. | |

OTHER PUBLICATIONS

Bouchard, T. et al., "Mobile telephones used as boarding passes: enabling technologies and experimental results," Fourth International Conference on Autonomic and Autonomous Systems, Mar. 2008, pp. 255-259.

United States Office Action, U.S. Appl. No. 14/621,297, dated Jun. 7, 2017, 11 pages.

United States Office Action, U.S. Appl. No. 14/621,300, dated Mar. 24, 2017, 17 pages.

Zimmerman, T. et al., "Travel Card: Airport Self-Check in Using a Wireless PDA," 2001 IEEE Intelligent Transportation Systems Conference Proceedings, Aug. 2001, pp. 1224-1228.

* cited by examiner

UPDATING DIGITAL WALLET ASSETS

CROSS REFERENCE TO RELATED APPLICATIONS

This application is a continuation of U.S. application Ser. No. 16/983,902, filed Aug. 3, 2020, which is a continuation of U.S. application Ser. No. 16/178,134 (now U.S. Pat. No. 10,755,266), filed Nov. 1, 2018, which is a continuation of U.S. application Ser. No. 14/621,302 (now U.S. Pat. No. 10,121,141), filed Feb. 12, 2015, which claims the benefit of U.S. Provisional Application No. 62/017,209, filed Jun. 25, 2014, all of which are incorporated herein by reference for all purposes.

BACKGROUND

Users of mobile devices are increasingly interested in using their devices as "digital wallets," e.g., to store coupons and tickets instead of using paper versions of those items. Unfortunately, updating digital wallet assets that have already been installed on devices can be difficult.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

With the prevalence of smartphones and other mobile devices, usage of a mobile device as a digital wallet has become increasingly popular (e.g., iOS Passbook and Google Wallet), allowing mobile device users to maintain digital representations of various, traditionally physical, assets, such as gym membership cards, airline boarding passes, frequent flier cards, debit cards, coupons, rewards cards, etc. Typically, however, the digital wallet assets are static, and once installed on a device, it can be difficult for an entity providing the asset, such as an airline, gym, or coffee shop, to update and manage the digital wallet assets that have been distributed. Described herein are techniques for management of digital wallet assets.

Figure 1:
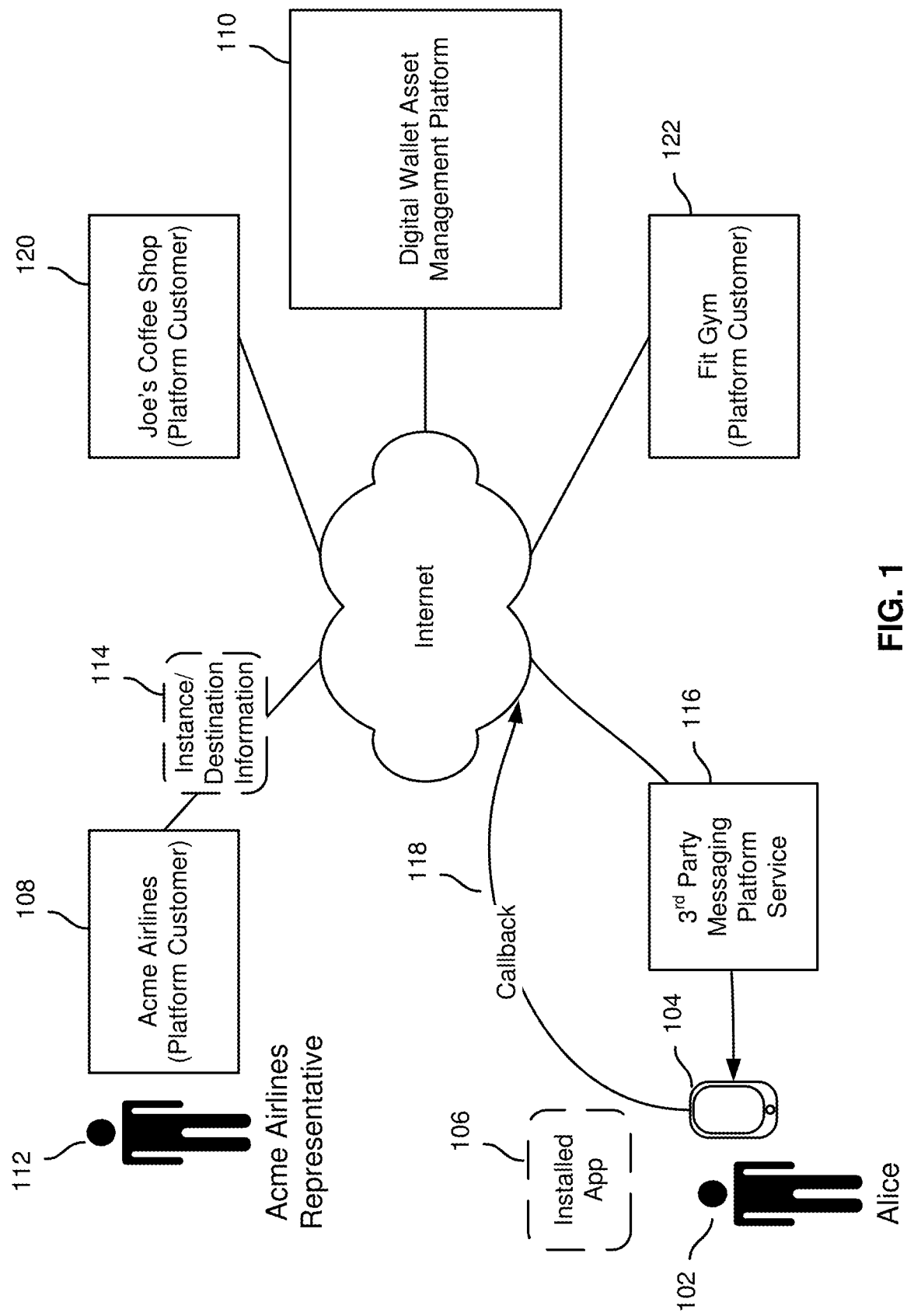
FIG. 1 is a diagram illustrating an embodiment of an environment for digital wallet asset management.

FIG. 1 is a diagram illustrating an embodiment of an environment where digital wallet asset management occurs. In particular, illustrated in FIG. 1 is an embodiment in which digital wallet asset management platform (110) facilitates the creation, management, and distribution of digital wallet assets on behalf of its customers/partners. In this example, the operator of platform 110 provides digital wallet asset management services to a variety of customers/partners, including businesses such as Acme Airlines (108), Joe's Coffee Shop (120), and Fit Gym (122). In some embodiments, instead of contracting with a digital wallet asset management platform, businesses can operate their own internal digital wallet asset management platforms, and digital wallet asset management is adapted accordingly.

Acme Airlines has partnered with the platform to handle the management of a variety of digital wallet assets, such as frequent flier cards, boarding passes, etc. For example, using the platform, Acme Airlines representative (112) has configured, via a web interface to the digital wallet asset management platform, a template for an Acme Airlines boarding pass, specifying the various fields that it will include, such as the passenger name, flight number, gate number, frequent flier number, boarding pass barcode, or any other appropriate flight information, the design of the boarding pass, as well as how the boarding pass should be rendered on the display of a device. As part of the template configuration process, the representative can also specify the fields that can be updated over time (e.g., departure/arrival time, gate number, etc.), as well as specify metadata tags that can be used to identify and locate boarding passes that potentially need to be updated in the future (e.g., identifying boarding passes by flight number).

In the example shown, Alice (102) is an Acme Airlines flier, and is heading to the airport to catch her flight. Alice has used her smartphone (104) to check into her flight, for example, via the Acme Airlines website, or via an Acme Airlines application (106) that Alice has installed on her phone.

Upon receiving an indication that Alice has checked into her flight, Acme Airlines (108) would like a digital representation of her boarding pass to be installed in a digital wallet in her phone, which she can then display (e.g., at the gate) in order to board her flight. Acme Airlines then communicates (e.g., via an Application Programming Interface) with the digital wallet asset management platform to facilitate the process of generating and delivering Alice's digital boarding pass.

When preparing Alice's boarding pass, Acme Airlines provides various information (114) to the digital wallet asset management platform, such as the template for the type of asset Acme Airlines would like installed (in this case, a boarding pass), Alice's information to include in Alice's instance of the boarding pass template (e.g., flight information such as Alice's name, frequent flier number, flight number, departure/arrival time, gate number, etc.), metadata tags to associate with Alice's instance of the boarding pass, as well as delivery information for sending the asset to Alice (e.g., Alice's email address, phone number, etc.).

Using the template identifier and instance information, Alice's boarding pass instance (a logical representation of her boarding pass) is generated. The actual digital boarding pass asset that will be served to Alice's mobile device for installation is then generated/derived from the logical instance, with the asset generated in a format that is appropriate to the operating system (e.g., iOS, Android, Blackberry, Windows Phone, Mozilla, etc.) of Alice's mobile device for installation. If Alice has a second mobile device associated with a different operating system, a second boarding pass asset specific to that operating system would additionally be created from the logical instance. A message (e.g., email message) is then sent to Alice with a link (e.g., URL) back to the asset management platform that will allow her to download her digital boarding pass to her mobile device. The boarding pass can also be attached to the email sent to Alice. A link to download the digital boarding pass can also be included in other messages to Alice, such as an SMS text to Alice, a push notification if Alice has the Acme Airlines application installed on her mobile device, or via any other appropriate message delivery channel.

Upon receiving the message including the link to download her digital boarding pass, Alice clicks on the embedded link to retrieve her digital boarding pass, which is then installed in the digital wallet on her phone. A callback (118) is made from the phone back to the digital wallet asset management platform, informing the management platform that the boarding pass has been successfully installed on Alice's mobile device. In some embodiments, the callback is received by the asset management platform via $3^{rd}$ party messaging service 116 associated with the mobile operating platform of Alice's device, instead of or in addition to being sent directly from the device to the digital wallet asset platform.

The callback can also include registration information tying Alice's boarding pass instance to her smartphone. This can include a device identifier of the smartphone that the boarding pass was installed on, as well as a serial number identifying Alice's installed boarding pass. By collecting such information, the digital wallet asset management platform can register and associate Alice's smartphone with her boarding pass for future updating. If Alice has multiple mobile devices (e.g., tablet in addition to her smartphone), she can also download her boarding pass on all her devices (e.g., by opening the notification email on all her devices and clicking on the link), and the devices which have installed the boarding pass can also be registered with her boarding pass instance, so that all installations of her boarding pass can be located for updating in the future.

Suppose that while Alice has been waiting for her flight, Acme Airlines has become aware of a weather issue, resulting in flight number 100, which Alice happens to be on, changing from gate "A" to gate "B." Acme Airlines would like all boarding passes associated with flight number 100 to be updated to reflect the gate change. Acme Airlines can initiate the update process by communicating a request to the digital wallet asset management platform, requesting that all boarding passes tagged with "flight number 100," which will include Alice's boarding pass, should have their "gate" field updated from "A" to "B."

Based on the information in the request, the digital wallet asset management platform identifies all of the boarding pass instances tagged with "flight number 100" and generates newly updated versions of those boarding passes that reflect the new gate change. Using previously collected registration information tying Alice's boarding pass instance to her smartphone, platform 110 can send Alice's smartphone a message, such as a push notification (e.g., via $3^{rd}$ party messaging platform (116)) that when received, will cause Alice's smartphone to make a callback to the platform in order to fetch/download the updated version of her boarding pass.

Once Alice's boarding pass has been successfully updated, it can be surfaced to the homescreen/lockscreen on Alice's smartphone display, notifying her of the gate change.

As will be described in more detail below, the workflows and mechanisms for instance generation, installation, updating, and distribution of digital wallet assets can depend on a variety of factors and can be adapted accordingly based on factors such as the operating system/type of a mobile device to which assets are to be sent, whether additional information can be gathered/collected (e.g., from an application installed on a device with a digital wallet asset) to infer whether an action (e.g., asset instantiation, asset installation update, etc.) should be performed/triggered, etc. As one example, if Alice has an iPhone, a push notification can be sent via the Apple Push Notification Service (APNS), to trigger the updating of the boarding pass. However, for different operating systems (e.g., Android, Blackberry OS, Windows Phone, etc.), other appropriate $3^{rd}$ party messaging platforms (e.g., Google Cloud Message for Android) can be used to mediate the update/distribution process, and the digital wallet asset management workflows can be adapted accordingly, for example, to allow for different protocols, which may require, for example, different sequences of callbacks of different types.

Digital Wallet Asset Management Platform

Figure 2:
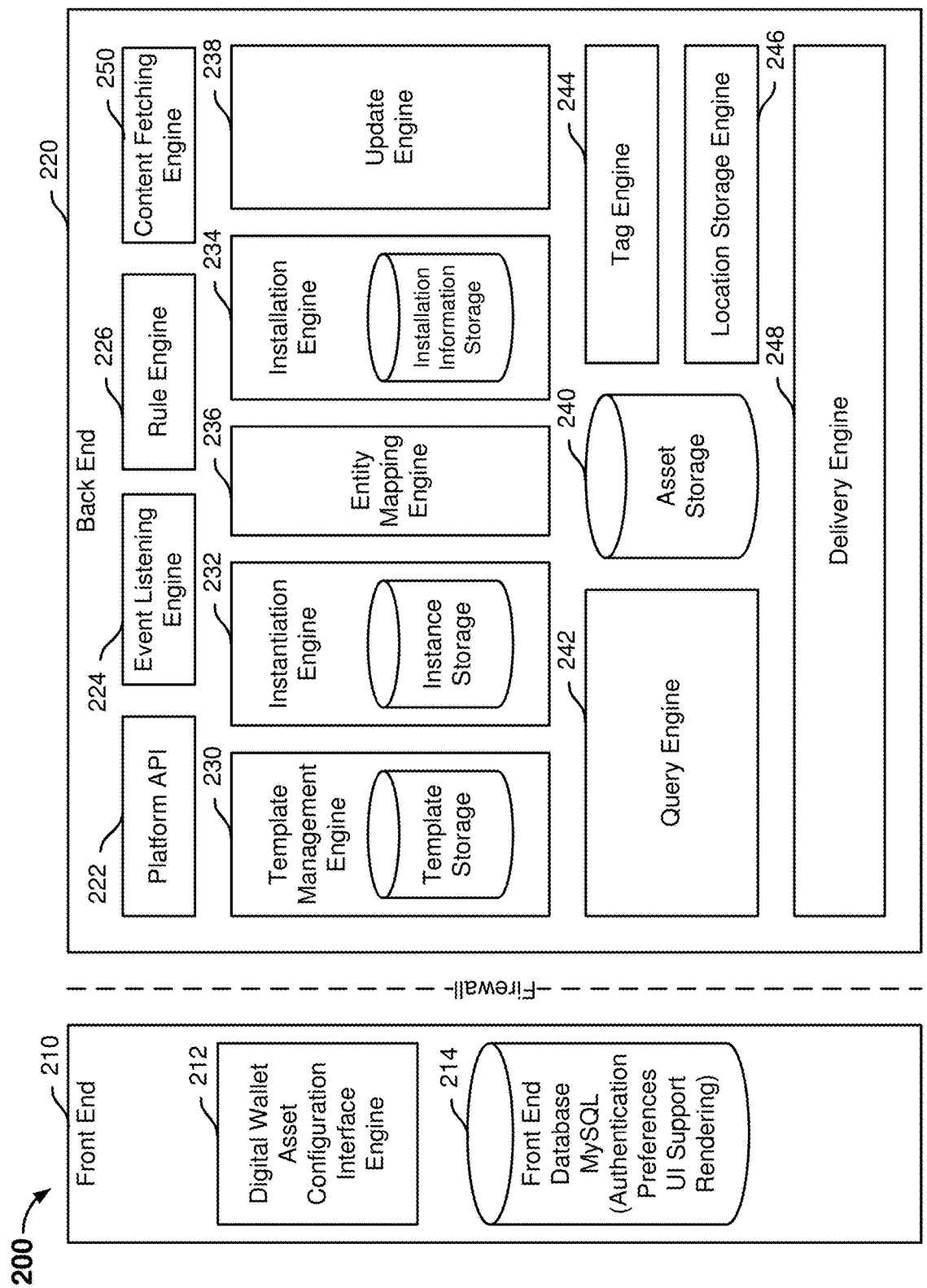
FIG. 2 illustrates an example of an embodiment of a digital wallet asset management platform.

FIG. 2 illustrates an example of an embodiment of a digital wallet asset management platform. In some embodiments, digital wallet asset platform 200 is an example of digital wallet asset management platform 108 of FIG. 1.

In the example shown, platform 200 includes front end 210 and back end 220. Front end 210 includes digital wallet asset configuration interface engine 212 and front end database 214. Back end 220 includes platform application programming interface (API) 222, event listening engine 224, rule engine 226, template management engine 230, instantiation engine 232, installation engine 234, entity mapping engine 236, update engine 238, asset storage 240, query engine 242, tag engine 244, location storage engine 246, delivery engine 248, and content fetching engine 250.

Digital Wallet Asset Management Platform Front End

In various embodiments, front end 210 provides a customer-facing view (e.g., web UI) of the digital wallet asset management platform that can be used to access processes performed/supported by platform backend 220 (e.g., via an API). The front end can also provide customer support services, such as authentication management and maintaining of customer preferences (e.g., if the platform supports multiple customers). An encryption layer can also be provided, as applicable.

Digital wallet asset configuration interface engine 212 is configured to provide a front-facing interface with which a customer of the platform (e.g., Acme Airlines representative) can interact with in order to configure digital wallet asset management. For example, the Acme Airlines representative can access/login to the digital wallet asset management platform via a web user interface in order to access a customer account on the platform and perform asset management activities. Upon signing in, the representative can have access to an authentication token that can be used to authenticate to an API (e.g., platform API 222) for communicating with the management platform backend. Authentication information (e.g., customer authentication token) and preferences for the customer can be accessed and stored via front end database 214, which can be implemented using MySQL. Various interfaces for actions such as asset template composition and update rule definition can be provided and supported by the interface engine, as will be described in more detail below.

In some embodiments, digital wallet asset configuration interface engine 212 provides an asset template composer interface, which provides the customer with an interactive interface to create and modify templates for digital wallet assets. Via the template composer interface, the Acme Airlines representative can create templates for a variety of assets, such as boarding passes, frequent flier cards, etc. In some embodiments, templates comprise asset models/structures that can be populated with actual data to generate logical instances of the template, which are logical representations of actual assets that are ultimately installed on an end user/entity's mobile device. Templates can be designed from scratch, or developed from default templates.

Creating/composing/editing a template can include creating a description of the template as well as specifying the design of the template. Specifying the design of the template can include editing logos, specifying media that is to be included in an asset (e.g., PNGs, JPEGs, etc.), QR code values, headers, footers, large text, label text, background, etc. Composing a digital wallet asset template can also include specifying/defining the fields (and keys) of the template model, specifying which fields can be updated, as well as specifying metadata associated with the template. In some embodiments, the metadata includes tags, which can be used for locating installations of digital wallet assets. In the example of an Acme Airlines boarding pass, the airline representative can specify that the assets/instances generated from the template are to be tagged by the "flight number" field, which can be used as a key when locating particular instances/assets. Thus, in the previous example where Acme Airlines would like to update the gate number of all boarding passes associated with "flight number==100," the airline representative can query for boarding passes that are tagged with "flight number==100" in order to update their gate numbers. In some embodiments, the selection of tags for the template is performed automatically. For example, the composed template can be automatically tagged with all fields that have been defined for inclusion in the template.

Additionally, the composer interface also allows the Acme Airlines representative to dynamically preview, while drafting, how a template will appear when received by a device such as Alice's smartphone. Previews for other types of mobile devices (e.g., running different operating systems, having different form factors, etc.) can also be generated. Test assets can also be generated and sent to mobile devices for test installation to see/preview how an asset appears on an actual device and to also test delivery of an asset derived from the composed template. Saved template scratchpad information, such as field names that are still being configured, can be stored in the front end storage. Examples of asset composer interfaces will be provided below. In some embodiments, the Acme Airlines representative can also send digital wallet assets that they are composing to mobile devices as a test to see how the digital wallet asset will be displayed on actual device.

In some embodiments, via the digital wallet configuration interface, the Acme Airlines representative can also configure rules that define criteria for triggering updating of digital wallet assets and other actions/workflows, which will be described in more detail below. Tests can also be performed to verify the performance of the rules, for example, to test whether updating of a pass is triggered correctly based on the defined rule criteria. Examples of ruleset composer interfaces will be provided below.

In some embodiments, the actions taken via the front end are translated into API calls to back end 220 to effect digital wallet asset management. For example, the actions taken in a template composition interface can be converted into API calls to template management engine 230 of the backend, resulting in template composition backend processes being performed (e.g., creation of template data structure). As another example, the updating rules configured by the Acme Airlines representative can be implemented by rule engine 226. In some embodiments, the front end communicates with the backend across a firewall.

Digital Wallet Asset Management Platform Backend

In some embodiments, backend 220 provides a backend infrastructure for digital wallet asset management data processes and workflows. The digital asset management platform backend infrastructure can be implemented, for example, on a Linux server, running an HTTP endpoint, which parses requests (e.g., API calls via platform API 222) that are made in the JSON format, and provides responses also in the JSON format. The data (e.g., images, text, key value pairs, etc.) included in the body of the JSON requests/responses can be binary data in base 64 encoded JSON. The various components and engines of the backend infrastructure can communicate/coordinate with each other via a message bus implemented, for example, using a Kafka queue. Other configurations and implementations of a digital wallet asset management platform are possible.

The components of the backend infrastructure can be accessed via front end 210 (e.g., by Acme Airlines representative 112 of FIG. 1), directly via API calls (e.g., from customer system) to the backend system, or via any other appropriate channel. For example, while an Acme Airlines representative can configure asset management via interaction with a web UI, Acme Airline can have code on their servers that directly calls into the backend infrastructure via API 222 in order to cause template instance generation, update calls, provide data to the backend, etc. In some embodiments, the backend infrastructure is configured to call into customer systems (e.g., customer relations management systems, databases, etc.) to retrieve information. The communication between the asset management platform backend and the customer can be authenticated via the customer's authentication token and encrypted. In the example shown, a single platform API (222) is shown which can be published and used to access the backend system, however, there can be more than one API to communicate with various components of the management platform infrastructure.

Event listening engine 224 is configured to listen for and observe incoming events to the backend infrastructure. In some embodiments, event listening engine 224 comprises a stream processing engine, implemented, for example, using a Kafka queuing system (a distributed queuing system), running on a cluster of commodity server hardware, such as Linux servers. The event listening engine is configured to listen for information/events to be passed on to the various components of the asset management platform backend. Various services and backend processes/actions/workflows (e.g., asset installation updates) can then be triggered. The event listening engine can be configured to communicate with a variety of sources (e.g., customers, devices, $3^{rd}$ party services, $3^{rd}$ party messaging platforms, etc.) of various types via one or more interfaces and communication channels. For example, events can be received via API calls, device callbacks, etc.

The event listening engine can be configured to observe information included in API calls. For example, communications via the API from customers of the management asset platform can be observed. Platform customer information can include template configuration information (e.g., via a template configuration interface), information to be included when generating instances of templates (e.g., template identifier, key values to populate instance, destination information for which instance assets are to be delivered, etc.), rule engine configuration (e.g., rule definition), asset management related requests (e.g., update request, installation requests, etc.), etc.

The event listening engine can also be configured to observe callbacks (which may also be implemented using API calls to the backend), which indicate, for example, the status of processes such as asset installation and updating. The callbacks can be observed from devices directly or via $3^{rd}$ party messaging platforms, with the event listening engine configured to communicate with either channel. As one example, the event listening engine can receive a device identifier (e.g., device token, user-defined identifier, opaque server-side generated identifier, etc.) and an instance identifier as part of an indication that an asset derived from a particular digital wallet asset logical instance (identified by corresponding instance identifier) has been successfully installed on a device associated with the device identifier. The device identifier can represent a discrete device or multiple devices The event listening engine can also be configured to observe event information collected by applications on mobile devices that may have asset installations. For example, in addition to digital wallet asset management, the management platform can also be configured to manage information collected from mobile device applications. A customer of the management platform may also provide applications that a user can install on their smartphone, and the applications can be configured (e.g., via an SDK) to batch device information and transmit it to the management platform backend. As will be described in more detail below, as a device may potentially have both an application installation and an asset installation that are both registered with and/or managed by the management platform, information collected from the application can potentially be used to influence/initiate asset management workflow processes, such as updating of the asset installation or any other related asset installations.

One example of event information that can be collected from an application installation is location event information. For example, if a mobile device user has opted into location tracking/collection services in an application installed on their device, location information, such as latitude/longitude information, timestamp information (e.g., indicating the time at which a latitude/longitude was collected), precision information (e.g., precision score indicating the precision of the location information), the source of the location information (e.g., GPS, WiFi, cell tower, etc.) can be collected. The collected device location event information can then be transmitted, for example, periodically (or in response to a significant location change occurring) to the asset management backend infrastructure via an API call, where the device location event information is observed by the event listening engine. An identifier of the application that collected the location information and a device identifier of the device whose location information has been tracked can also be included in the device location event information. The observed location event information can then be stored, for example, in location storage engine 246.

Any appropriate information collected from a mobile device application can be stored, and in some embodiments, a mapping can be performed that associates a device identifier with an application. The device identifier can then be effectively used as a bridge between asset installations and applications collocated on the same device, which can in turn be used to influence asset installations on other devices. For example, if Alice has her boarding pass installed on both her smartphone and tablet, location event information collected on her smartphone can be used to influence updating of both the boarding pass on the smartphone as well as the boarding pass installed on the tablet.

The event listening engine can also be configured to observe events received from $3^{rd}$ parties such as point of sale systems, customer relation management platforms, etc., which can be used to trigger asset management workflows such as asset instantiation, asset installation updates, etc. For example, the event listening engine can communicate with a point of sale system that sends an indication that a digital coupon for a free song has been redeemed. The event listening engine can pass that information to rule engine 226, which can have a rule defined that specifies that a coupon that is redeemed is to be deleted. Appropriate update processes to delete the installed redeemed coupon can then be triggered in response to the redemption event from the $3^{rd}$ party having been observed.

Rule engine 226 is configured to facilitate ruleset definition and rule-driven initiation/triggering of asset management actions/workflows based on evaluation of observed events and defined rulesets. For example, Joe's Coffee Shop, (customer 120 of platform 110 of FIG. 1) can define a ruleset that specifies that if it is detected that a digital coupon on a user's mobile device for a free cup of coffee has been redeemed, then the digital coupon should be automatically deleted and removed from the user's mobile device. Thus, for example, if the rule engine determines that an observed event (e.g., received as part of stream processing via event listening engine 224) matches criteria of the defined ruleset and that a coupon redemption event has occurred, deletion of the digital coupon on the user's mobile device can be dynamically initiated/triggered.

Rulesets can be configured/defined (e.g., by a customer/owner of the management asset platform) via a user interface such as digital wallet asset configuration interface engine 212 of front end 210, as well as specified directly via an API call to the rule engine. In some embodiments, a ruleset comprises a dynamic set of rules/logic used to determine an appropriate action/workflow to take/initiate. Defining a ruleset can include defining a series of expressions that are to be applied to observed events and the appropriate actions/workflows to initiate in the event that criteria of the ruleset are matched by an observed event. Multiple rulesets can be defined for various scenarios. In various embodiments, rule-driven actions/workflows include template instantiations, asset installations, update of asset installations, notifications, etc.

In some embodiments, as part of the rule definition process, tests to verify rules can also be configured and executed (e.g., via a user interface). For example, by coordinating with various appropriate components of the management backend (e.g., event listening engine, rule engine, query engine 242, delivery engine 248, etc.), test events can be sent to the rule engine to determine whether the test events are evaluated appropriately according to the defined rules and whether the appropriate result is produced (e.g., testing whether update of a test asset installation is correctly performed according to specified rules).

In some embodiments, the rule engine is configured to receive as input an observed event (e.g., from event listening engine 224). The rule engine is also configured to evaluate the observed event against one or more defined rulesets. For a given ruleset, the rule engine is configured to apply a series of expressions defined in the given ruleset to the observed event. Based on the evaluation of the observed event and application of the series of expressions, it is determined whether the observed event matches criteria of the ruleset. In various embodiments, defined criteria can include data dimensions and attributes (e.g., temporal dimensionality, spatial dimensionality, etc.), tag information, etc. The expressions defined in a ruleset can include various types of operations, such as mathematical, logical, comparison, Boolean, etc. For example, a ruleset could be created to upgrade a digital wallet frequent shopper rewards card from gold to platinum status when a user's application data obtains a tag for "gold_status".

If the criteria are met by the observed event, the rule engine is also configured to identify and initiate an appropriate action/workflow, as well as return any appropriate information (e.g., metadata tags for locating asset installations, new asset content values, etc.) to be used in facilitating the execution of the identified actions/workflows. The outputs of the evaluation can be defined when specifying a ruleset.

In some embodiments, in order to determine whether the criteria specified by the rules are met, rule engine 226 is configured to perform an evaluation of the information included in a location event. This can include communicating with and querying various components of the asset management platform, such as query engine 242, entity mapping engine 236, tag engine 244, location storage engine 246, etc. For example, to determine whether location/time criteria/dimensionality of a rule set are met by a device, the latitude/longitude and timestamp information included in a device location event can be passed to location storage engine 246 for evaluation. The location storage engine can be configured to determine whether the device, based on the latitude/longitude information is within a particular radius of a location that is defined by the location criteria of the rule set. As another example, the location storage engine can be queried to determine whether a device has been in a location within a certain time period (e.g., time dimensionality rule criteria).

Additionally, the rule engine can be configured to communicate with tag engine 244 to determine whether a device or logical instance associated with an observed event satisfies metadata tag criteria. For example, a device, template, and/or logical instance identifier included in or otherwise associated with observed event information can be sent to the tag engine 244 to return the tags associated with the device, template, and/or logical instance. The returned tags can then be matched against tag criteria specified in the rule set to determine whether the rule has been satisfied with respect to tag criteria.

As one example scenario, Fit Gym (customer 122 of platform 110 of FIG. 1) can define a rule that specifies that if an observed device location event matches certain location and time criteria/attributes as well as certain tag criteria, then an update to a user's digital gym membership card is to be initiated to reflect a new promotion. Suppose that Alice is a member of Fit Gym and that she has a digital gym membership card in the digital wallet of her smartphone that she uses to check into the gym (e.g., by scanning a QR code embedded in the digital gym membership card). The gym also makes available an application that Alice has installed on her smartphone. Alice has allowed the gym application to collect location information, which can be observed by event listening engine 224 and sent to the rule engine. The rule engine can be configured to determine, based on an evaluation of her latitude/longitude information (e.g., observed device location event information) and associated tag information, that she is a VIP member that has been in San Francisco recently, and that she satisfies criteria for a new promotion for VIP gym members in San Francisco. An update workflow can then be initiated to update Alice's instance of her digital gym membership card (e.g., identified via the device identifier for Alice's mobile device that was transmitted with the device location event information) with information about the new promotion, and the regenerated membership card pushed to her and installed on her device to notify her of the promotion. In this example, the ruleset defined by the gym can be used to effectively bridge an application installed on Alice's mobile phone with her digital wallet asset, and information collected via the application has been fed back to the platform to influence the installed digital wallet asset (e.g., by updating the asset installation).

Other rules can also be defined. For example, a movie rental company that is a customer of the platform can define a ruleset that specifies that if an event is observed in which a movie is checked out by a movie renter (e.g., via QR code or barcode of renter's membership card), the renter's instance of their digital membership card is to be updated with information about the movie that has been rented, the return-by date, etc., and a newly updated membership card with the new information can be served for installation on the renter's mobile device. In this example, feedback can be provided to the asset management platform (e.g., via API calls) from the movie rental company's point of sale/rental system, and a digital wallet asset can be regenerated based on the inferential data and pushed back to a user.

As another example, Acme Airlines, which provides the asset management platform with flight status information such as delays for various flight numbers, can define a rule that specifies that if a flight is delayed by more than 30 minutes, a $5 digital airport voucher should be automatically sent to passengers on the delayed flight. The rule engine can then observe the flight status information, and if it is determined that a delay event has occurred and that a flight is to be delayed by more than 30 minutes, the corresponding flight number of the delayed flight can be used to identify passengers (e.g., via their digital boarding passes, which can be tagged by flight number), and a $5 digital airport voucher sent to the mobile devices of the passengers. The digital boarding passes of the passengers on the delayed flight can also be updated to reflect a new departure time based on the delay.

As another example scenario, a rule could be defined to calculate "tier changes" for businesses that perform tracking of loyalty points. Suppose, for example, that Acme Airlines has three tiers of loyalty programs: Spark, Flame, and Inferno, where the three tiers are listed in order of number of points needed to acquire the tiers. A special field on the digital wallet asset can be specified as holding the points, while another field displays the tier level. Once a flight or an upgrade is purchased, an increase in points occurs. This reflection of an update in points can either occur manually by a customer support agent or automatically by a point of sale system via an API call. Upon an update in points, the ruleset engine calculates the new tier level and updates the installed digital wallet asset accordingly.

Template management engine 230 is configured to facilitate the configuration of digital wallet asset templates. In various embodiments, template management/configuration can be performed via an interface such as one provided by digital wallet asset configuration interface engine 212, or via direct API calls to the template management engine. In some embodiments, the template management engine includes template storage, which is used to store the various template models/data structures of the assets that a customer has created/composed. Additionally, corresponding information, such as identifiers for the templates (e.g., serial numbers which can be used for retrieval when creating instances of a template), template content (e.g., text, headers, footers, etc.), and any media to be included in the template (e.g., logos, images, etc.) can also be stored in the template storage. The template management engine can also be configured to perform manipulation of items associated with templates, for example, compression of large image files to be included in digital wallet assets. The template management engine can also be configured to facilitate the testing of digital wallet asset configuration, for example, by performing test installations/updates of assets derived from the template on mobile devices in order to verify how an actual asset will appear on a device.

Instantiation engine 232 is configured to facilitate the generation of logical instances of digital wallet asset templates. The instantiation engine is also configured to facilitate the generation of digital wallet assets derived from the logical instances. For example, when Alice checks into her flight, Acme Airlines can recognize the check in, and in response, place an API call to the asset management backend to request the creation of Alice's instance of the boarding pass template. The generated instance comprises an intermediate logical representation of Alice's boarding pass, which is populated with actual data key values merged with the keys specified in the template model from which the instance is created. A boarding pass asset that is in a format appropriate to the operating system of Alice's mobile device (e.g., iOS, Android, etc.) is then generated from the intermediate logical instance. The generated platform-specific asset can then be provided for download and installation to a mobile device.

In some embodiments, the instantiation engine is configured to receive a request to generate an instance of a template. Requests can include explicitly made requests (e.g., explicitly made by a customer of the platform), rule-driven requests (e.g., automatically generated by rule engine 226 in response to a rule/ruleset being triggered), received from a mobile device (e.g., end user entity requests a coupon by clicking on a promotion displayed in an application on their smartphone), etc.

The received request can include an indication of a template for which a logical instance is to be created. (e.g., template identifier). The received request can also include the data values specific to the instance to be generated, which are to be merged to the keys specified for the identified template. For example, Acme Airlines, when calling into the asset management backend to request creation of Alice's digital boarding pass, can provide the template identifier for the boarding pass template as well as Alice's boarding pass information. The template identifier, when received, can then be used by the instantiation engine to locate and retrieve the appropriate template from the template storage of the template management engine. An instance of the boarding pass template can then be populated/merged with Alice's boarding pass information to generate a logical instance of Alice's boarding pass. The logical instance of Alice's boarding pass can also be associated with metadata tags as specified during template configuration, such as the flight number of the flight that Alice is a passenger on. The logical instance of Alice's boarding pass is also associated with an instance identifier (e.g., serial number) that can be used to identify the logical instance of Alice's boarding pass. The instance identifier can be global to the asset management platform. In various embodiments, the instance identifier is specific to a particular customer of the management platform, a particular template of the customer, etc. In some embodiments, the instance is tagged by tag engine 244, which includes a database that stores associations between tags and instance identifiers.

More than one instance of a template can also be created in response to a request being received (e.g., as part of a batch process). For example, if Alice has checked into the flight not only for herself, but for the three other members of her family also on the flight, a request can be received by the asset management platform to generate four logical instances of the boarding pass template, one for each member of Alice's family, including herself. Along with the template identifier for the boarding pass template, an array data structure can also be received, with each data object in the data structure representing a particular grouping of boarding pass data values corresponding to a particular member of Alice's family. The instantiation engine is then configured to perform a mail merge to merge and apply the appropriate groupings of key values to a respective instance of the four logical boarding pass template instances. Each instance is then also appropriately tagged and associated with its own respective instance identifier. In some embodiments, the instance tags, which can be created by tag engine 244, are associated with/mapped to their respective instances by entity mapping engine 236, as will be described in more detail below.

Different mobile device operating platforms (e.g., iOS, Android, etc.) may have different, platform-specific interpretations of digital wallet assets. Each platform may have its own requirements and specifications for how digital wallet assets are to be formatted, packaged, processed, delivered, etc. A logical asset instance comprises an intermediate logical representation of a digital wallet asset that includes all relevant and appropriate information (e.g., key values) common to any digital wallet asset, regardless of mobile device operating platform. In some embodiments, the instantiation engine is further configured to generate one or more platform-appropriate/specific assets that are derived/constructed/prepared from the information included in a logical asset instance.

The derived assets constructed from the intermediate logical instance are the assets that are ultimately served to one or more mobile devices for installation, and are each packaged/formatted in a manner that is compatible with a particular mobile operating platform. The processing and generation of a platform specific asset can include bundling and packaging the logical instance information (e.g., keys, key values, etc.) into a platform-specific data structure (e.g., JSON file), compressing the bundles (e.g., generating a zip file of the bundle), signing (e.g., with a private key) the bundle, or any other appropriate processing/formatting for a particular operating system platform. The bundle may be included as a payload of a data structure installed as a digital wallet asset on a given mobile platform. Thus, for example, if Alice has both iOS and Android mobile devices, two boarding pass assets will be generated from the same logical instance of her boarding pass, the first appropriate for the iOS platform, the second appropriate for the Android platform. As the ultimate platform-specific assets are derived from a common pool of data included in the intermediate logical instance, support for additional mobile platforms can be added dynamically/on-demand, for example, via adaptors that are configured to construct an asset for the new platform from the information of a logical asset instance.

In some embodiments, the instantiation engine is configured to automatically and pre-emptively generate assets corresponding to multiple mobile device platforms in order to accommodate/anticipate the potential platforms of end-user mobile devices. For example, after generating Alice's boarding pass instance, iOS, Android, Windows Phone, Blackberry, Mozilla versions of Alice's boarding pass can be automatically generated pre-emptively such that an appropriately formatted asset is available/ready to be served once the platform-type of Alice's mobile device(s) (e.g., via received device identifier during asset installation) is determined. In some embodiments, the appropriate platform-specific asset can be generated based on historical information associated with an end-user entity (e.g., a priori knowledge of the mobile operating system(s) of Alice's device(s)).

In some embodiments, the derived assets are generated on-demand. For example, assets of a specific platform are created only as necessary/when requested. Thus, an iOS version of Alice's digital boarding pass can be generated after Alice requests her boarding pass from her iPhone, but an Android version of her boarding pass is not generated unless Alice indicates that she would like her boarding pass installed on her Android tablet as well (e.g., by opening, on her Android tablet the email that includes a link to download the boarding pass, and clicking on the link).

The instantiation engine is also configured to store generated platform-specific digital wallet assets, for example, via asset storage 240. In some embodiments, a piece of cryptography that is associated with the signed and compressed bundle can also be written to the asset storage. The stored assets can then be fetched and delivered to end user entities for mobile device installation.

Installation engine 234 is configured to facilitate the installation of digital wallet assets. As described previously, the platform-specific assets derived from a root logical instance are the objects/entities ultimately served/fetched and installed on the mobile devices of end user entities. In some embodiments, the installation engine is configured to communicate with a plurality of asset management components, such as event listening engine 224, rule engine 226, instantiation engine 232, asset storage 242, location storage engine 246, and delivery engine 248 to coordinate asset installation.

In some embodiments, installation of digital wallet assets includes distribution of digital wallet assets. This can include generating a message to be sent to an end user destination indicating that a digital wallet asset is available for download. The delivery channel/distribution mechanism/destination information by which the asset notification message is to be sent can be received as part of the request to generate an instance (e.g., included in instance information data structure array along with corresponding key value groups). In some embodiments, the indicated distribution mechanism provides a vehicle/mechanism by which to include a reference (e.g., Universal Resource Locator link) that when clicked on by a mobile device user, can be used to trigger retrieval/fetching and installation of an appropriately formatted digital wallet asset. In some embodiments, the reference clicked on by an end-user entity includes a qualifier that can be recognized by a mobile device as an indication that the URL is associated with a digital wallet asset, and that the received/downloaded asset is to be inserted into the digital wallet of the mobile device. The link can also be tied to a particular instance, such that if a callback is made via the link, the asset management platform recognizes the particular logical instance from which corresponding derived assets are to be delivered.

Distribution mechanisms for the reference to the asset can include delivery channels such as an email address, phone number, mobile device application, social networking site page, or any other appropriate delivery channel/destination information. Based on the distribution mechanism, a message in an appropriate format (e.g., email, SMS text, push notification, social network message etc.) can be distributed to facilitate distribution and installation of digital wallet assets.

In some embodiments, the installation engine is configured to receive a request/indication to install a digital wallet asset. The request can be received in a callback to the backend from a mobile device in response to an end user entity clicking on the URL to a digital wallet asset in the distributed message described above. In response, the digital wallet asset can be fetched (e.g., retrieved from asset storage) and provided/delivered to the mobile device (e.g., via delivery engine 248) for download and installation. In some embodiments, the callback can include information such as authentication information (e.g., authentication token, cryptography key, etc.) that can be used to provide authentication when communicating with the device (e.g., delivering asset to device). The callback can also include an identifier of the discrete device on which the asset is to be installed (e.g., device token for iOS devices, opaque external asset identifier), as well as an identifier of the instance that the installed asset is derived from (e.g., instance serial number/identifier). The authentication information can also be stored in a cryptography storage.

The callback can be received from the mobile device on which the digital wallet is to be installed, via a $3^{rd}$ party platform service (e.g., Apple Push Notification Services for iOS, Google Cloud Messaging for Android, etc.) that mediates/brokers communication between the asset management platform and the mobile device, or via any other appropriate channel, with processing of the callback adapted accordingly.

In some embodiments, a digital wallet asset is included as an attachment in the distribution mechanism and installed directly to a mobile device, without requiring fetching/retrieval of the asset from the asset management backend infrastructure. The asset can be delivered in a manner (e.g., via a qualifier included in a link to download the asset) such that an application used to open the attachment (e.g., email application) can recognize the attachment as a digital wallet asset and process the attachment accordingly (e.g., include the digital wallet asset in the digital wallet of the device, display the asset in a particular manner, with an icon provided with the asset, etc.).

In some embodiments, the installation engine is also configured to receive status information associated with installation of a digital wallet asset, such as information indicating the success/failure of an asset installation. If an asset is installed multiple times (e.g., multiple installations of a specific asset), status information can be received for each installation, along with the corresponding device identifiers of the devices on which the assets is installed. The status information can be included in a callback (e.g., via backend API) to the asset management platform indicating that installation of the digital wallet asset is successful, failed, etc.

For a given device installation, the combination of the corresponding device identifier (representing the device on which an asset was installed) and associated instance identifier can then be stored (e.g., via entity mapping engine 236) and used by the asset management backend to register asset installations and establish an entity mapping between instances and their respective installations. The combination of an instance identifier and a device identifier can also be used to locate asset installations for future actions (e.g., updating). The registration can be performed upon successful installation of a digital wallet asset (indicated via status information). The mapping can then in turn be used in identifying/locating devices for future updates to the installations. Regarding instance-to-installation mapping, an instance identifier can be associated with more than one device identifier, for example indicating that an asset derived from a logical instance has been installed on multiple discrete devices (e.g., any two installations of the same instance on discrete devices will be associated with different device identifiers). A single device identifier may also be mapped to multiple logical instances (e.g., device has multiple digital wallet assets installed).

In some embodiments, entity mapping engine 236 is configured to map asset instances with respective asset installations. As described previously, the assets derived from a root logical asset instance are ultimately installed on one or more devices. When a logical instance of an asset is updated, the corresponding asset installations will also ultimately need to be updated. Via the entity mapping engine, the appropriate mobile devices which have an asset installation corresponding to the updated instance can be identified for updating.

In some embodiments, the entity mapping engine is configured to map/associate/register asset installations with logical instances in the management platform via the combination of instance identifiers and discrete device identifiers received during asset installation (e.g., included in status information during installation).

The entity mapping engine is also configured to associate mobile devices with instance metadata tags. In some embodiments, during logical instance generation, a logical instance is associated with metadata tags (e.g., boarding pass instance tagged with flight number). As the entity mapping engine is configured to establish a mapping between instances and mobile devices that have successful asset installations, the metadata tags associated with the logical instance can also be associated with/assigned to the various mobile device installations.

In some embodiments, the assigning of metadata tags to mobile device asset installations is performed and stored by tag engine 244 (e.g., by queuing a job to tag engine via message bus). With device identifiers (e.g., device tokens) assigned to metadata tags, asset installations can be identified directly by tag, for example, in subsequent queries for a particular tag in order to locate asset installations that are to be updated. In some embodiments, by persisting information associated with asset installations, such as metadata tags, instance information, device information, etc., (static) assets installed on remote mobile devices can be dynamically identified and updated.

For example, in the scenario where the gate for Alice's flight has been changed from "gate A" to "gate B," Acme Airlines would like the boarding passes installed on the mobile devices of flight passengers to be updated. Acme Airlines can first perform a lookup of the entity mapping engine to return all logical boarding pass instances that are associated with the tag "flight number=100." A request can be made to update all of the identified instances with the new gate number, as well as regenerate the assets derived from the logical instances, which can be stored in asset storage.

Acme Airlines can subsequently make an API call to the backend to push an update to all installations tagged with "flight number=100" (where the mapping of metadata tags of the boarding pass instances to their respective installations had been previously performed by the entity mapping engine). Based on the query using the flight number tag, the appropriate installations can be returned, with the installations (e.g., mobile devices identified by their respective device tokens) being sent requests to call back into the backend infrastructure to fetch/download newly updated boarding pass assets.

Update engine 238 is configured to facilitate the updating of digital wallet assets. Updating digital wallet assets can include updating the content (e.g., images, text, etc.) of logical instances, the assets derived from the instances, and the installations of the derived assets.

In some embodiments, update engine 238 is configured receive a request to update a digital wallet asset. The request can be received via one or more API calls to the asset management backend infrastructure. The received API calls can include instance identifiers of the asset instances to be updated. In some embodiments, the API calls includes metadata tags, which are to be used to identify instances to be updated. The API calls can also include new content (e.g., stored in an array structure similar to instance data) with which logical instances and corresponding assets are to be updated.

In some embodiments, the received update request is generated in response to rule criteria having been met. For example, update engine 238 can be configured to coordinate with rule engine 226 to provide logic for rule-driven updating, allowing for updates to be performed programmatically. As described previously, the update process can be triggered in response to observed events meeting rule criteria, and the rule criteria can include temporal dimensionality, spatial dimensionality, metadata tags, or any other appropriate factor that can be used to determine an appropriate time/ situation for performing a digital wallet asset. Event observation (e.g., performed via event listening engine 224), which can include observing events/data that are collected/provided by various upstream components (e.g., applications installed on mobile devices, 3$^{rd}$ party platforms such as payment platforms, point-of-sale systems, redemption platforms, etc.), coupled with defined ruleset criteria, can provide a feedback mechanism by which collected data from various upstream components can be used to infer when an update should occur.

Thus, an update request can be received in response to a set of rule criteria being satisfied by an observed event, and the update request can include, based on information included in the observed event and the defined rules, appropriate metadata tags, device identifiers, the new content with which logical instances and corresponding assets are to be updated, as well as any actions to take.

In some embodiments, update engine 238 is also configured to identify logical asset instances to be updated. This can be performed via metadata tags received in an update request. For example, a lookup of entity mapping engine 236 can be performed to return all instances mapped to or otherwise associated with the received metadata tags. Update engine 238 can then be configured to load the received new content and regenerate the identified instances with the received new content. In some embodiments, subsequent to regenerating identified instances, update engine 238 is also configured to regenerate/reconstruct, for each of the identified instances, corresponding platform-specific assets, which can then be stored to static asset storage.

In some embodiments, subsequent to regenerating identified logical asset instances and corresponding backend assets, update engine 238 is configured to identify mobile device asset installations which are to be updated. For example, a lookup of tag engine 244 via query engine 242 using received metadata tags can be performed to return all device identifiers (e.g., device tokens) corresponding to discrete mobile devices that have the asset-to-be-updated installed.

In some embodiments, update engine 238 is then configured to send an update instruction to the identified installations. The update instruction, when executed by a mobile device, causes the local asset installation specified in the update instruction to be updated. In some embodiments, update engine 238 can make an API call (or any other appropriate request) to delivery engine 248 to deliver/distribute the update instruction to the mobile devices that have installations of the updated logical instance that need to be updated. The wire format of the update instruction message can depend on the mobile platform of the mobile device to which an update instruction is being sent. For example, in iOS, the update mechanism comprises a properly formatted push notification, while in Android, the updated mechanism comprises a proprietary synchronization mechanism (specific to Google's® platform). As will be described in more detail below, in some embodiments, delivery engine 248 is configured to properly format update instructions according to the respective mobile operating platform protocols of the devices to which the update instructions are to be sent.

In some embodiments, update engine 238 is also configured to receive status information about updates (e.g., via API callback from device, 3$^{rd}$ party messaging platform, etc.) indicating the status of updating the installation (e.g., successful, failed, unknown, etc.).

In some cases, a digital wallet asset stored in the backend may not have been installed on any mobile devices, and the updating process ends with refreshing of the logical instance and corresponding backend-stored assets. This scenario, however, can lead to asset version drift (e.g., temporal drift as assets are updated over time). For example, Alice's gym, Fit Gym, has had an instance of her membership card generated, and sent an email to Alice with a link for downloading her digital membership card. However, Alice has not yet clicked on the link, and therefore does not yet have the membership card installed on her phone. In the meantime, the gym has decided that an updated version of Alice's membership card should instead be delivered, and the gym makes an update call to the asset management platform to update Alice's membership card instance as well as generate a newly updated version of the membership card asset stored on the backend. In some embodiments, update engine 238 is configured to recognize that there does not yet exist an installation of the membership card asset, and when Alice eventually clicks on the installation link in the email, the update engine can be configured to perform version control and accounting of drift of the asset by delivering the newly updated version of her membership card rather than the previous version, which may be stored for archival purposes.

In some embodiments, updating includes deleting digital wallet assets. For example, a request to delete an installation can be received, and in response, update engine 238 can be configured to perform a lookup of entity mapping engine 236 to identify logical instances to be deleted (e.g., via received metadata tags). The update engine can then be configured to delete the corresponding assets stored in the backend to prevent accidental installation of the asset to be deleted. The update engine can then also be configured to identify all device installations of the asset to be deleted (e.g., via lookup of tag engine 244 via query engine 242 using metadata tags), and send to the identified device installations an instruction that causes the installation of the asset requested to be deleted.

Asset storage 240 is configured to store digital wallet assets. In some embodiments, asset storage 240 comprises specialized storage configured to process static data items of large capacity (e.g., assets with large media) at high throughput and low latency. One example implementation of asset storage 240 is Amazon S3. As described previously, mobile platform-specific assets can be derived from logical instances and stored in asset storage 240. Additional information corresponding to the platform-specific assets, such as cryptography, can also be stored in asset storage 240. The assets stored in the backend asset storage can then be provided for installation on mobile devices. For example, references to the assets can be provided in messages, such that when the reference is clicked on, for example, by an end user entity, an appropriate asset can be fetched and downloaded on the end user's device.

Query engine 242 is configured to communicate with and query multiple backend databases of various types, such as tag engine 244 and location storage engine 246. Tag engine 244 and location storage engine 246 can be queried to find devices (e.g., represented by device identifiers), logical asset instances (e.g., via instance identifiers), etc. that match criteria of a search request/query. For example, the query engine can communicate with tag engine 244 to request all logical asset instances tagged with "flight number==100," and instance identifiers/serial numbers corresponding to boarding pass instances tagged with "flight number==100" can be returned.

The search request/query may specify metadata tags of interest, location dimensionality of interest (e.g., latitude/longitude, geographical region), time dimensionality of interest, etc. In some embodiments, a search request query may include Boolean logic operators (e.g., conjunction/AND, disjunction/OR, negation/complement/exclusion/NOT, XOR, etc.) used to further refine returned results. For example, a query can request all end user entities (e.g., represented by device identifiers) that are tagged as VIPs AND have been in San Francisco within the past three hours AND have also been in New York within the last month.

The database backends, such as tag engine 244 and location storage engine 246, that query engine 242 communicates with may be disparate, independent storage backend databases existing on heterogeneous clusters returning their own separate streams of results (e.g., device identifiers, instance identifiers, etc.). As a search query may request information stored on both the tag engine and location storage engine, in some embodiments, query engine 242 is also configured to generate sub-queries from an original query that are sent/routed to the respective backend databases. The sub-queries can also be generated based on the logical (e.g., Boolean) operators specified in the query.

Additionally, as each storage backend may return its own separate stream of results (e.g., device identifiers, instance identifiers, etc.), in some embodiments, query engine 242 is also configured to merge-join the respective separate results streams into a unified set of results (e.g., single stream of device identifiers) that match, for example, both location and tag criteria specified in a search query. The merge-joining can be performed according to Boolean logic specified in the search query request.

Tag engine 244 is configured to store and maintain metadata tag information and associations (e.g., with devices and instances). In some embodiments, the tag engine is implemented on a single server or a cluster of servers (e.g., Linux servers), and can be implemented using Cassandra. The stored associations can include mappings between metadata tags and various types of items, such as installations (e.g., represented via device identifiers), instances (e.g., represented via instance identifiers/serial numbers), etc., where the tag engine is also configured to perform the associations/mapping.

Location storage engine 246 is configured to process received location event information (e.g., from device updates/location events observed by event listening engine 224), such as the GPS coordinates and observation timestamps described above. In some embodiments, the processing includes using the location information to index a device by time and place (e.g., temporal and spatial dimensions). In some embodiments, the location storage engine is configured to convert a received latitude/longitude into a set of polygons which encompass the latitude/longitude. In some embodiments, polygons represent descriptive boundaries of locations, and the location storage engine is configured to determine/detect whether a device has crossed a particular polygon boundary or is within a certain radius of a particular polygon. The descriptions can be of geographical locations/regions of varying granularities/precisions, such as neighborhoods, ZIP codes, counties, cities, states, countries, continents, hemispheres, etc. In some embodiments, custom polygons can also be designed or used to define a region of interest, such as company's sales regions, buildings, malls, landmarks, congressional districts, school districts, etc. In some embodiments, the boundaries of locations can be described using multi-polygons. For example, the state of Hawaii can be described in a multi-polygon as it is composed of multiple islands. Another example of a geographical region defined using a multiple-polygon is the United States (e.g., Alaska, territories, etc.). Multi-polygons can also result due to gerrymandering or because of physical bodies (e.g., lakes, mountains, etc.).

In some embodiments, location storage engine 246 is configured to store a record/representation for a device (e.g., a device identifier such as a token) to a location bucket index database. One example implementation of a location bucket index database is a single server or a cluster of servers using a column-based database such as Cassandra. In some embodiments, the device (represented by its device identifier, which can be included in the device update) is stored in buckets, and is indexed by the polygons that it has been in and the time that it was in the locations/regions defined by the polygons. Thus, a device identifier can be effectively tagged by time and location dimensions.

In some embodiments, location storage engine 246 is also configured to communicate with rule engine and 226 and query engine 242 to facilitate the determination of whether location criteria specified by a set of rules is met by an observed event. For example, as part of a rule used to determine whether a coupon asset installation should be updated, a retail store chain providing the coupon and that is a customer of the platform can define a rule that specifies that if a device with the coupon installed is detected to be within a mile of a store in California operated by the chain, then the coupon installed on the device is to updated with an additional promotion for 10% off a total purchase up to 100 dollars. In some embodiments, when location event information is received (which may have been collected by an application on the device), the rule engine can determine whether the device satisfies the location/time criteria of the rule by passing the latitude/longitude include included in the received location event information to the location storage engine, which determines/detects whether the latitude/longitude is within a mile of polygons representing the California stores of the retail chain.

Delivery engine 248 is configured to facilitate delivery of messages associated with digital wallet asset management. In some embodiments, delivery engine 248 is configured to receive a request to deliver a message. The request can include a message or type of message (e.g., update instruction, delete instruction, etc.) to be delivered, as well as entity information used to locate devices of interest, such as metadata tags.

In some embodiments, delivery engine 248 is configured to query, for example via query engine 242, backend storage engines such as tag engine 244 and location storage engine 246 using the received metadata tags in order to receive a set of device identifiers matching criteria of the query. As described above, the query can also specify Boolean logic operations, which are also processed by the query engine.

In some embodiments, delivery engine 248 is configured to route returned device identifiers to appropriate/correct communications adaptors. The communications adaptors can be included in an adaptor layer of the delivery engine, with each communication adaptor corresponding to a particular $3^{rd}$ party message delivery service, which may be associated with a particular mobile platform. For example, delivery engine 248 may include a first communications adaptor configured to communicate with Apple Push Notification Services (APNS), which mediates and facilitates communications/messaging with iOS mobile platform devices. The delivery engine may also include a second communications adaptor configured to communicate with Google Cloud Messaging (GCM), which mediates and facilitates communications/messaging with Android mobile platform devices. Each mobile operating platform may require messages to be configured in a particular wire format, and have different protocols regarding authentication, retry policies, etc. specific to the mobile platform, and the respective adaptors can configure messages to be delivered accordingly.

Along with a device identifier, the message/type of message to be sent to the mobile device (represented by the device identifier) is also routed to a correct adaptor. In some embodiments, an authentication mechanism, such as a cryptography key, that corresponds with the device identifier is retrieved from a cryptography store (the cryptography key, for example, having been stored to the cryptography store after being received during confirmation of asset installation) and transmitted along with the device identifier and message to be delivered. The cryptography key can be used as authentication to connect to a third party messaging service and to deliver a message to a device represented by the device identifier.

Given the type of message to be sent, such as an update or delete instruction, the delivery engine, via an appropriate adapter, is also configured to generate a message in the proper format. For example, in iOS, if an update instruction is to be sent, a push notification that has an empty payload can be generated that when processed on an iOS device, causes the device to make a call back to the asset management platform in order to retrieve an updated asset specified in the push notification. As another example, in iOS, a delete installation instruction can also be sent in the form of a push notification that when processed on the iOS device, causes an asset installation specified by the push notification to be deleted.

In an Android operating system scenario, for example, using Google Wallet, if a create or update instruction is issued, an API called is made to Google's Wallet platform with the data needed for the asset. This asset is then distributed via Google to all devices associated with that particular user. In some embodiments, the API call uses OAuth 2.0 by a secret token passed via HTTP headers.

Content fetching engine 250 is configured to fetch content to be included/incorporated into digital wallet assets. For example, in some embodiments, template can be configured to include content such as images (e.g., a customer's photo on a loyalty card). In some embodiments, specifying the content to include in a template/digital wallet asset, a URI (e.g., that is publicly reachable) that links to the content can be provided. The content is then fetched by the content fetching engine, which stores the content locally (e.g., on the backend platform). In some embodiments, the content fetching engine takes into account HTTP caching limits (based on time-to-live values or expiry dates) in order to reduce latency and bandwidth usages. In some embodiments, the content fetching caches an image locally and creates a fingerprint of the content (e.g., by using a hashing algorithm), allowing the content fetching engine to determine whether an image to be fetched has already been previously fetched and stored locally. Using the fingerprint can also aid in reducing latency as well as save local storage space.

The engines described above can be implemented as software components executing on one or more general purpose processors, as hardware such as programmable logic devices and/or Application Specific Integrated Circuits designed to perform certain functions or a combination thereof. In some embodiments, the engines can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The engines may be implemented on a single device or distributed across multiple devices. The functions of the engines may be merged into one another or further split into multiple sub-engines.

The various components and engines of the digital wallet asset management platform can be operated by a single entity or multiple entities and split accordingly. For example, in a first scenario, an entity such as Acme Airlines can perform both asset instance creation and distribution of emails for asset installation, while in a second scenario, Acme Airlines can perform asset instance creation, but have a separate entity perform the email distribution/delivery on behalf of the airline.

Figure 3:
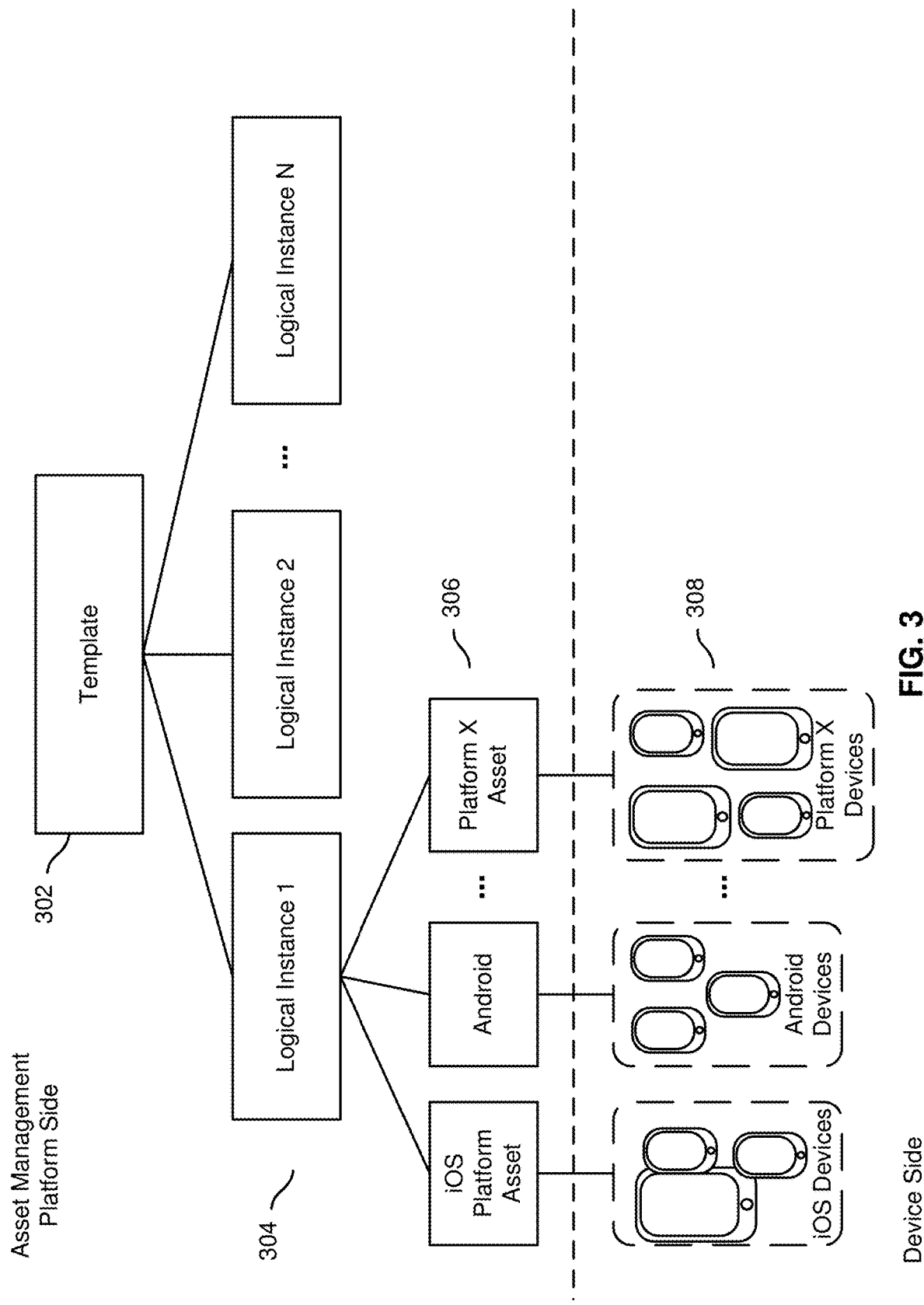
FIG. 3 is a diagram illustrating an embodiment of the relationship/hierarchy between templates, instances, assets, and installations.

FIG. 3 is a diagram illustrating an embodiment of the relationship/hierarchy between templates, instances, assets, and installations. In the example shown, templates, logical instances, and platform-derived assets are maintained on the asset management platform side (or the side of the customer), while installations of assets are on mobile devices. For a single template (302), multiple instances (304) can be generated. In turn, multiple platform-specific assets can be derived from a single instance. Each of the platform-specific assets can in turn be downloaded to multiple devices. Thus, for example, when a logical instance is updated, multiple installations (e.g., devices) will need to be located for updating as well.

Template Composition

Template composition is described below. As described above, templates comprise models of assets, and the design and content of templates can be configured by a user, for example, by a front end composer interface.

Figure 4:
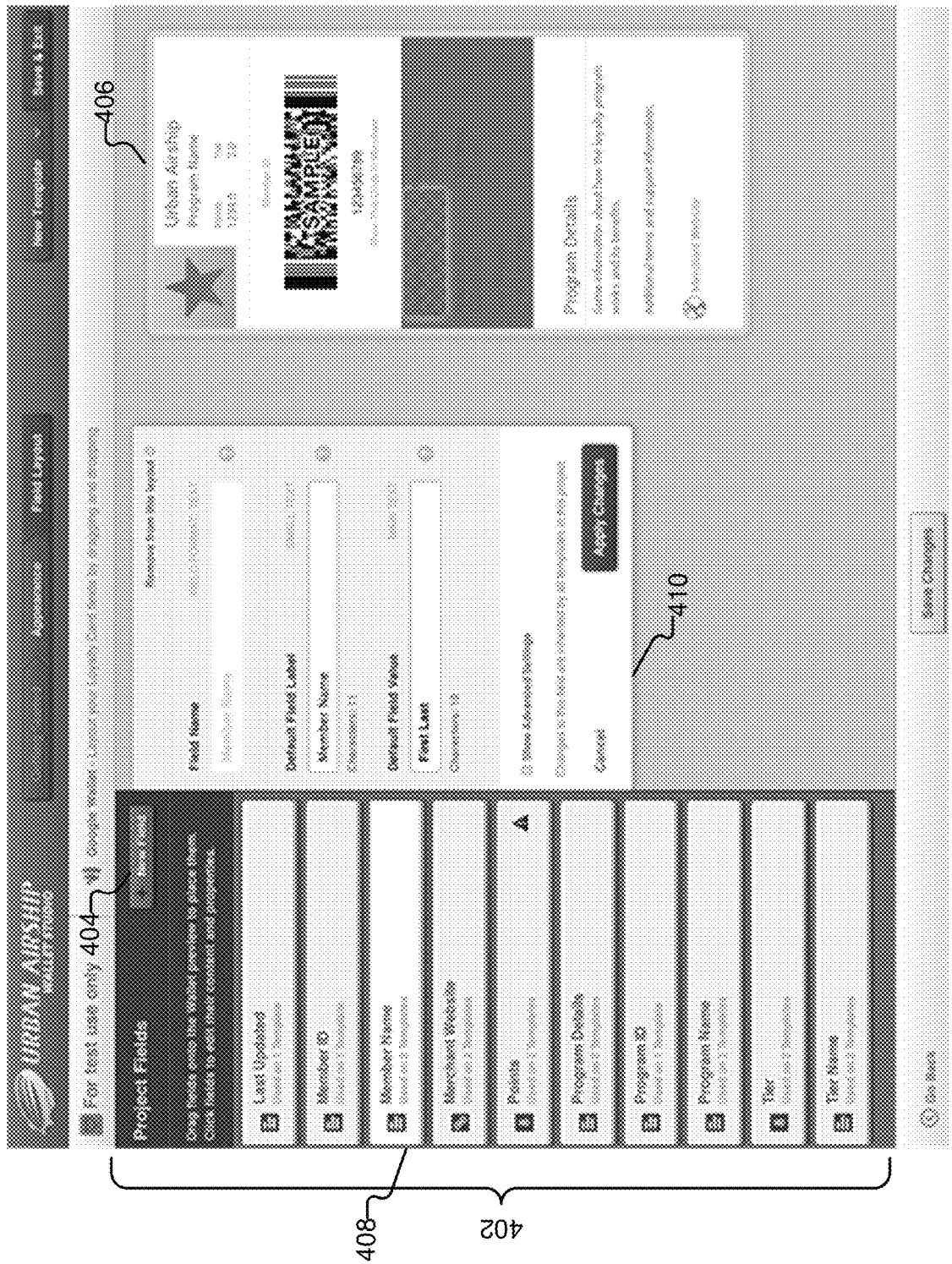
FIG. 4 is a diagram illustrating an embodiment of an interface for template composition.

FIG. 4 is a diagram illustrating an embodiment of an interface for template composition. In this example, configuration and preview of a digital wallet asset for the Google Wallet digital wallet platform is shown. At 402, example fields that can be included in a digital wallet are shown. New fields can also be added in the configuration/composition studio at 404. In this example template configuration/composition studio, the fields shown at 402 can be dragged onto and placed on the digital wallet asset preview 406, which shows a preview of the digital wallet asset as it is being configured with the project fields 402. In some embodiments, the candidate fields to be included in a digital wallet asset are configurable. For example, a user can click on the "member name" field 408, causing an additional window 410 to be opened, where the user can configure various aspects of the "member name" field, such as default field label, default field value, etc. Once configured, the changes can be applied to the preview. Changes made to the various fields that are included in the template can be shown in the preview in real-time as the changes are being made.

Figure 5:
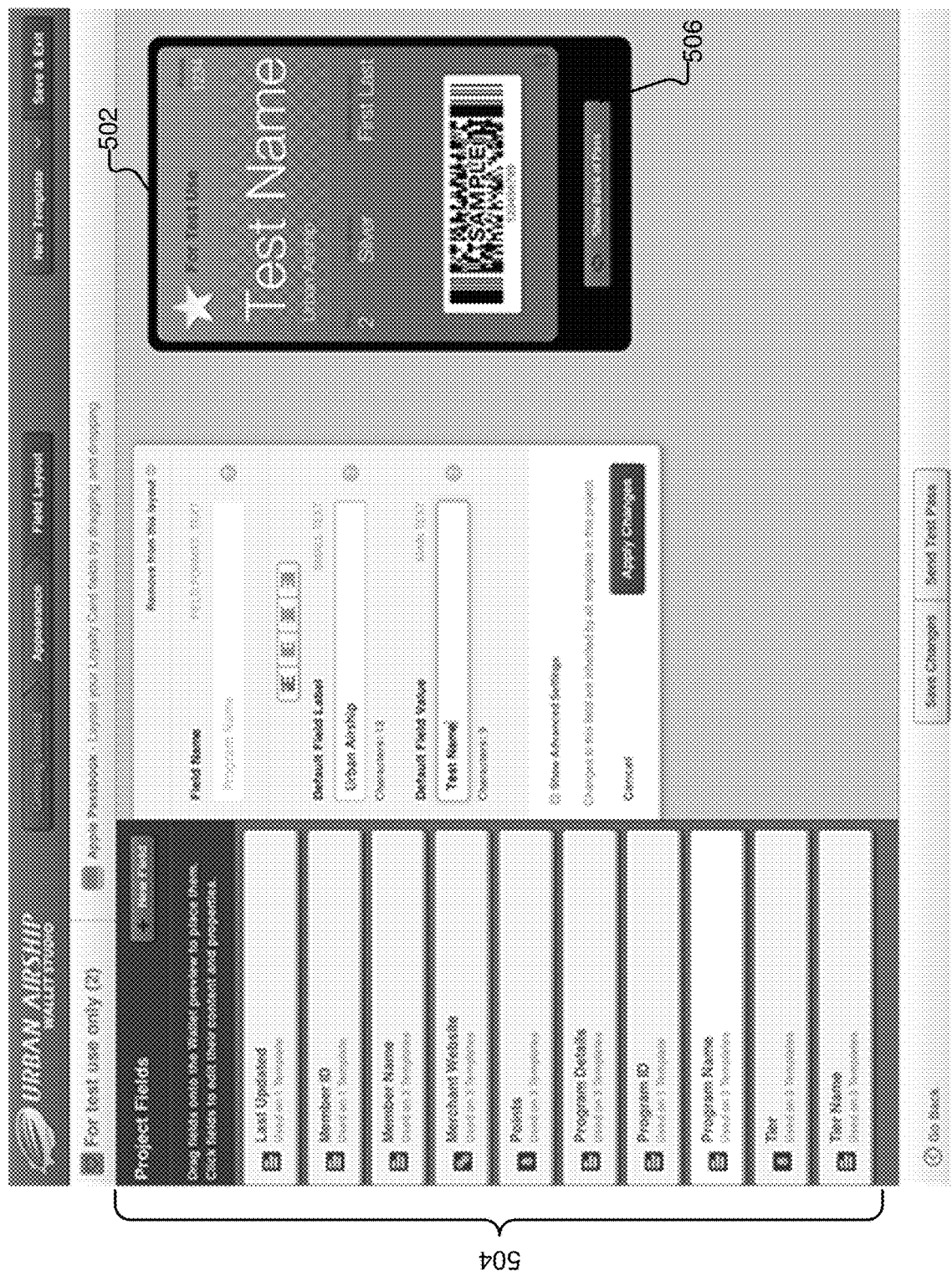
FIG. 5 is a diagram illustrating an embodiment of a digital wallet asset preview.

FIG. 5 is a diagram illustrating an embodiment of a digital wallet asset preview. In this example, an example interface of a studio for configuring digital wallet assets is shown. A preview of a digital wallet asset in the Apple iOS platform that is being configured is shown in this example at 502. As shown, the preview reflects, in real-time, changes made to a digital wallet asset, for example, by a user configuring various project fields (504). In some embodiments, the front and back of passes can be shown in the preview (506).

Figure 6:
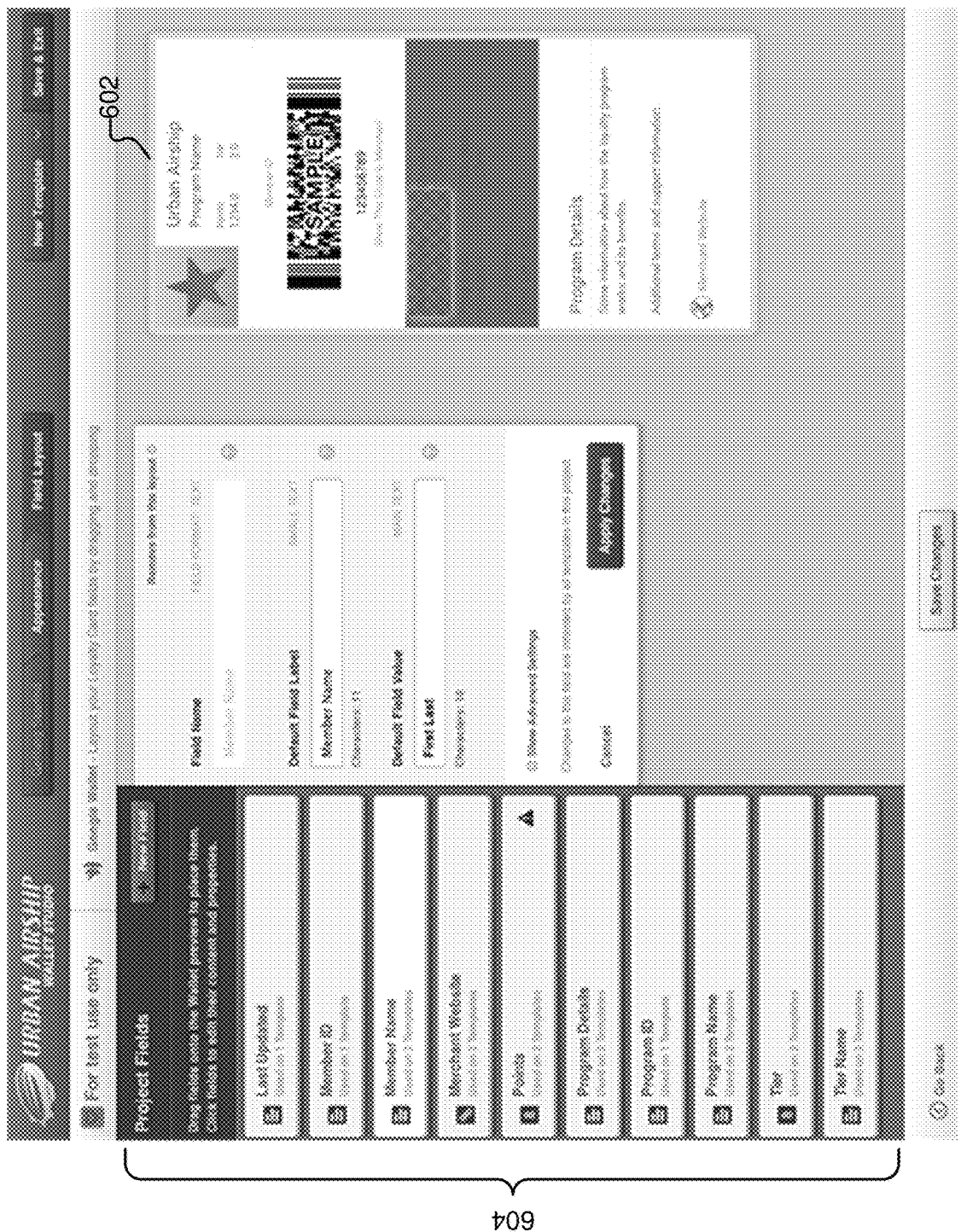
FIG. 6 is a diagram illustrating an embodiment of a digital wallet asset preview.

FIG. 6 is a diagram illustrating an embodiment of a digital wallet asset preview. In this example, a preview of a digital wallet asset in an Android platform (Google Wallet) is shown at 602. As shown, the preview reflects, in real-time, changes made to a digital wallet asset, for example, by a user configuring various project fields (604).

Instantiation of Digital Wallet Assets

Examples of the generation of logical asset instances are described below. In some embodiments, logical asset instances comprise particular instances of templates (such as those described above) that are populated with data values, and that are a representation of the digital wallet assets that are ultimately delivered to mobile devices for installation.

Figure 7:
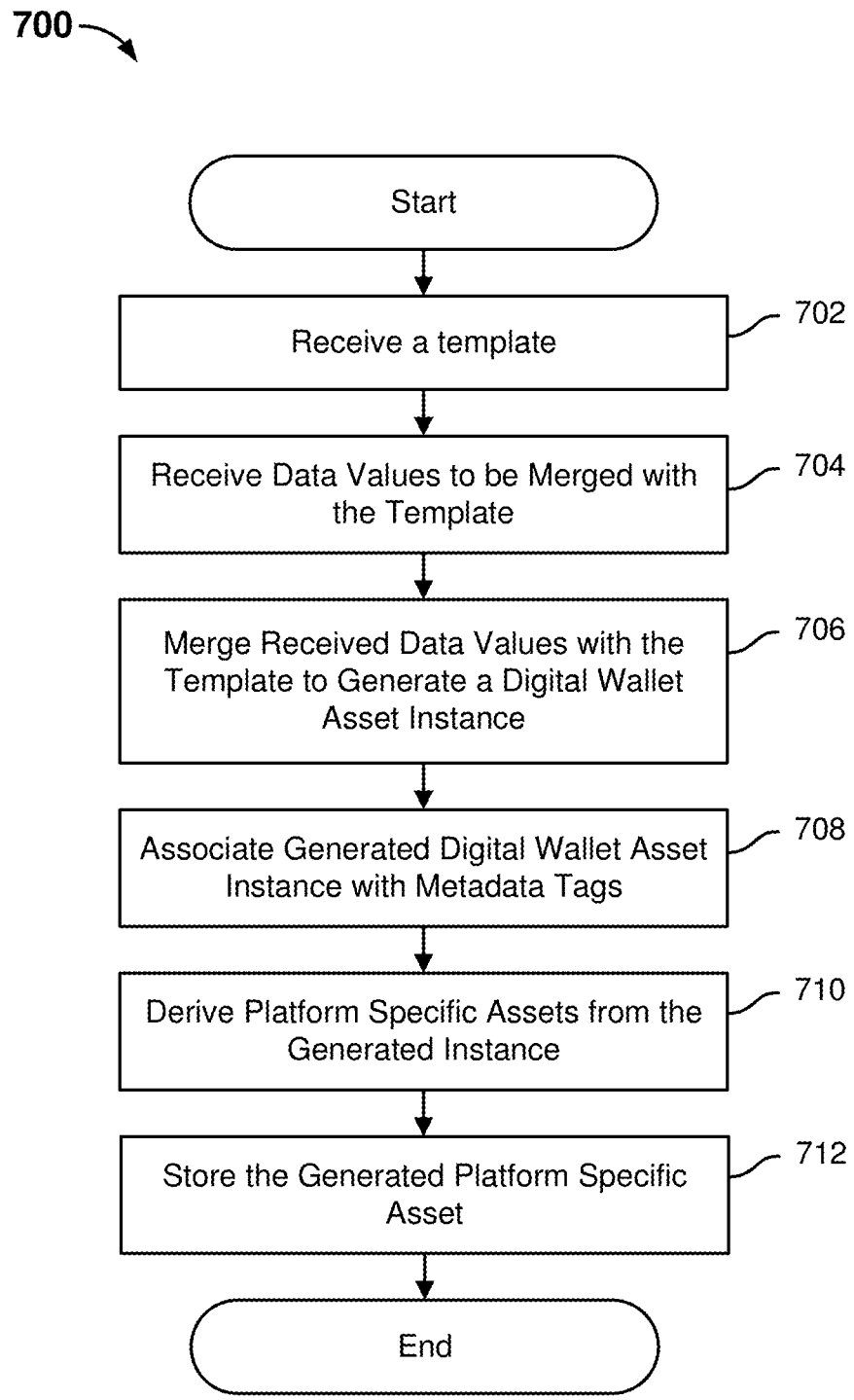
FIG. 7 is a flow diagram illustrating an embodiment of a process for generating a digital wallet asset instance.

FIG. 7 is a flow diagram illustrating an embodiment of a process for generating a digital wallet asset instance. In some embodiments, process 700 of FIG. 7 is executed by instantiation engine 232 of FIG. 2. The process begins at 702 when a template is received. As described above, the template can comprise a model of an asset, where the model specifies the keys/fields of an asset, the design of the asset, the content of the assets (e.g., QR code values, headers, footers, large text, label text, background, media, etc.), as well as the metadata keys that are to be used as tags for the asset. In some embodiments, particular fields/keys of the template can also be designated as being metadata tags, so that a logical instance of the template can be tagged with the data value merged to the designated key. For example, the "flight number" is both a field that appears on a boarding pass, as well as a metadata tag that can be used to locate the boarding pass. The keys/fields that are to be updated are also designated. The templates can be configured, for example, via a composer interface (e.g., supported by digital wallet asset configuration interface engine 212 of front end 210 of FIG. 2), and stored to template storage of template management engine 230 of FIG. 2, from which they can be retrieved. In some embodiments, a not-yet filled copy of the template is received to generate an instance of the template.

In some embodiments, the template is received in response to a request to generate an instance of a template (e.g., received via an API call by a customer). The request can include a template identifier used to locate the template from which instance(s) are to be generated. In some embodiments, the request to generate an instance can be generated based on an observed event matching criteria specified by a rule set (e.g., determined via an evaluation by rule engine 226).

At 704, data values to be merged with the template are received. In some embodiments, the data values correspond to the particular template instance to be created, and the keys/fields of the received template will be populated/merged with their corresponding respective data values (which may be received as key-value pairs). In some embodiments, multiple instances of the template can be created, and a mail merge can be performed with multiple sets of data values, with each set corresponding to a particular instance being generated. For example, an array data structure of groupings of data values can received, which includes data values corresponding to a plurality of instances to be created, for example, for batch processing. Each element of the array can correspond to a grouping/collection of data values for a particular instance of the template. In some embodiments, contact information of end user entities (e.g., mobile device users) that assets derived from the generated instance are to be delivered to is also received. The contact information can include email addresses, phone numbers, mobile device application identifiers, etc. The contact information can be later used to notify an end user entity that they have a digital wallet asset ready to be installed.

At 706, the received data values are merged with the received template instance to generate a digital wallet asset instance. For example, received data values are merged to corresponding keys specified in the template.

At 708, the generated digital wallet asset instance is associated with metadata tags. For example, the data values merged to keys designated as being metadata tags can be mapped to the instance as tags or the instance can be automatically tagged with all or a subset of the key values included in the instance. The associations can be stored, for example, to tag storage in tag engine 244.

In some embodiments, templates can also be configured to support the ability to have images defined for them on a per-pass basis. An example of such an image is a customer's photo on a loyalty card. An image can be included, for example, by uploading the image along with the pass creation or update instruction. The image can also be included, for example, by including a URL of the image in the digital wallet asset/pass creation or update instruction where an image fetching engine (e.g., using content fetching engine 250 of FIG. 2) pulls the image from a publicly-reachable URI and then stores the image locally. In some embodiments, the image fetching engine takes into consideration HTTP caching limits (based on time-to-live value or expiry dates) in order to reduce latency and bandwidth usage. The image fetching engine then caches an image locally and creates a fingerprint of the image (e.g., by using hashing algorithms) so that it can be determined whether an image has already been stored locally, as well as in order to reduce latency and save local storage space.

At 710, platform-specific digital wallet assets are derived from the generated digital wallet asset instance. A logical asset instance comprises a logical representation of a digital wallet asset, and includes data values corresponding to a particular instance of a template. However, the ultimate asset installed on a mobile device must adhere to specifications defined by the mobile operating platform (e.g., iOS, Android, Blackberry, Windows Phone, etc.) of the mobile device on which the asset is to be installed. Thus, the data included in an instance can be packaged/bundled and formatted in a manner appropriate for a given mobile operating platform to generate an asset, with a different asset generated for each mobile operating platform. For example, an iOS-appropriate asset can be created in which the data values included in a logical instance are compressed (e.g., into a ZIP file), signed (e.g., using authentication key), and associated with a piece of cryptography, according to an iOS-specific protocol. The information of a logical instance can be bundled and processed according to different protocols specified for different types of mobile operating platforms to generate platform-specific digital wallet assets. Copies of the generated platform-specific assets are then downloaded and installed on various mobile devices.

In some embodiments, the platform-specific digital wallet assets are generated at the time that an asset instance is created, in order to pre-emptively accommodate the various types of mobile platform operating systems available. In some embodiments, the platform-specific digital wallet assets are generated on-demand, as the types of mobile operating platforms that digital wallet assets are to be installed on is determined, for example, when a device of a particular mobile operating platform requests installation of an asset. At 712, the generated platform-specific digital wallet asset is stored, for example, to a database such as asset storage 240 of FIG. 2.

Figure 8:
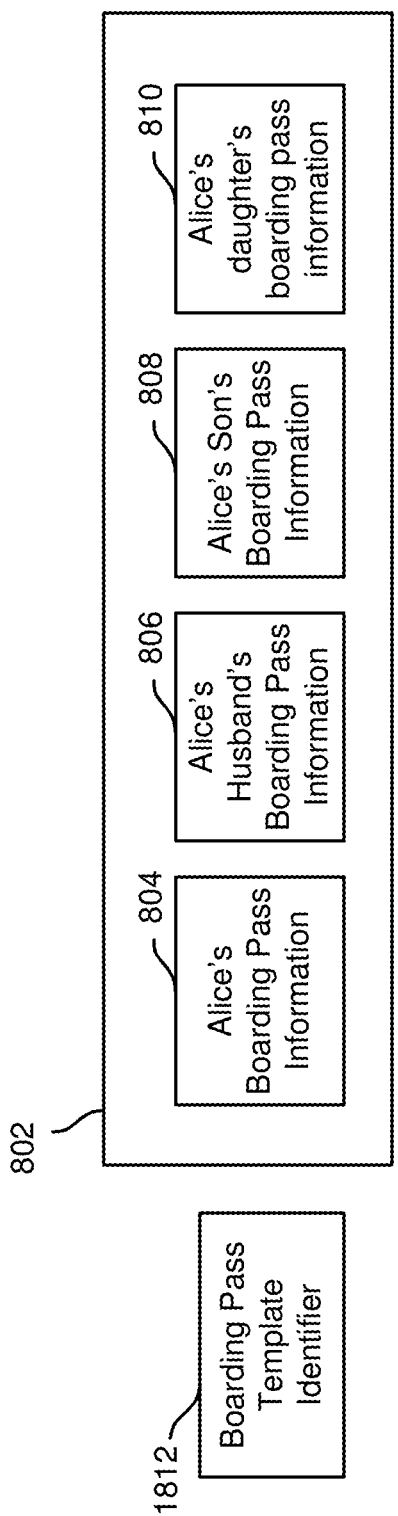
FIG. 8 is a diagram illustrating an embodiment of an array data structure (802) of key values for digital wallet asset instance generation.

FIG. 8 is a diagram illustrating an embodiment of an array data structure (802) of key values for digital wallet asset instance generation. In the example shown, Alice has checked herself and the three other members of her family into an Acme Airlines flight. In response, Acme Airlines communicates with a digital wallet asset platform to generate four boarding pass instances, each corresponding to a member of Alice's family. As part of the instantiation process, Acme Airlines passes to the asset management platform four sets of data values (804, 806, 808, and 810) that are to be used to populate each of the four boarding pass instances. Each set of data is an element of the array data structure, and the array data structure is also sent with a template identifier (812), which is used to indicate to the asset management platform, the template from which the four boarding pass instances are to be generated. Each of the four instances will be merged with a corresponding set data set from the array data structure, resulting in four boarding pass instances, one for each member of Alice's family.

Installation of Digital Wallet Assets

Installation of digital wallet assets is described below. In some embodiments, digital wallet assets are constructed from the logical asset instances described above. The constructed digital wallet assets are ultimately downloaded and installed to the mobile devices of end user entities.

Figure 9:
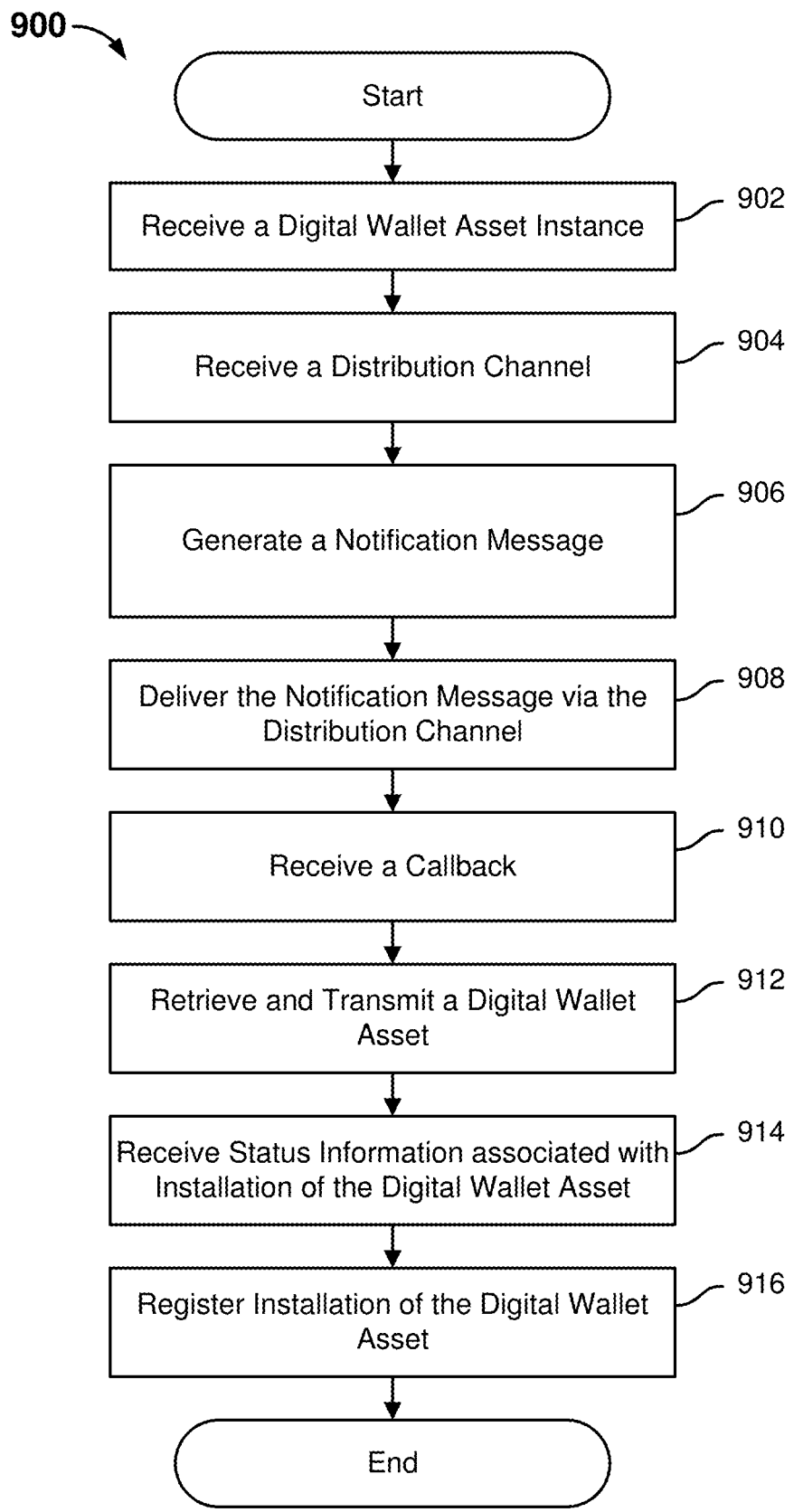
FIG. 9 is a flow diagram illustrating an embodiment of a process for installing digital wallet assets.

FIG. 9 is a flow diagram illustrating an embodiment of a process for installing digital wallet assets. In some embodiments, process 900 of FIG. 9 is executed by installation engine 234 of FIG. 2. The process begins at 902 when a digital wallet asset instance is received. In some embodiments, digital wallet assets derived from the digital wallet asset instance are also received.

At 904, a distribution channel is received. In some embodiments, the distribution channel comprises contact information used to notify end user entities that a digital wallet asset is available to be downloaded. The contact information can include an email address, phone number, device identifier for a mobile device (e.g., device token), application identifier (e.g., of application installed on end user mobile device), push token (used to send push notifications to devices, etc.

At 906, a notification message indicating the availability of a digital wallet asset is generated. In some embodiments, the message comprises a notification indicating that a digital wallet asset is available for download. In some embodiments, the message includes a link (e.g., Universal Resource Locator) that when clicked on by an end user entity on a device that received the message, causes a callback to the URL to be made to the asset management platform, requesting an asset of a particular instance to be provided for downloading to the device for installation in the device's digital wallet. The link can be a URL tied to a specific logical instance, such that only an asset of the specific logical instance is provided by the asset management system. In some embodiments, the link includes a qualifier that indicates to the device that the object being downloaded in response to the link being clicked is a digital wallet asset and that the returned object is to be processed accordingly and placed in the device's digital wallet. In some embodiments, a digital wallet asset is included as an attachment in the message.

In some embodiments, the type of message generated is based on the delivery channel information received. For example, if an email address is received, then an email notification message including the installation link is generated. If a phone number is received, then a short message service (SMS) notification message including the installation link is generated. If a device identifier (e.g., device token) or push token is indicated as the distribution channel, then a push notification can be sent to the device that includes the installation link. In some embodiments, the installation link is hosted on a web page. For example, a link to a generic coupon can be posted to a social networking site, such that any member of the social networking site can click on the link to download and install the coupon to their digital wallet. At 908, the message is delivered via the received distribution channel.

At 910, a callback is received. The callback can be received in response to the link in the notification message being activated (e.g., clicked on) at a device. The callback, which may originate from the device, can be received directly from the device or via a $3^{rd}$ party messaging platform that mediates communications with an asset management platform on behalf of the device. In some embodiments, callbacks originating from or otherwise associated with multiple discrete devices can be received. For example, if the notification message is an email sent to Alice's email address, and Alice has both a smartphone and a table, Alice can potentially open the email on both devices, triggering two separate callbacks to the asset management backend requesting assets derived from the same logical instance to be installed. In some embodiments, a callback to the system includes an indication of the mobile operating platform (e.g., iOS, Android, Blackberry, Windows Phone, Mozilla, etc.) of the device from which the callback originates. The mobile operating platform information can be used to serve an asset derived from the logical instance that is formatted accordingly for the specific mobile operating platform of the device.

At 912, a digital wallet asset is retrieved and transmitted. In some embodiments, in response to receiving a callback, a digital wallet asset is loaded from static asset storage (e.g., asset storage 240 of FIG. 2) and delivered to a requesting device for installation. In some embodiments, given the link provided in the notification message that the callback is made to, the particular instance of interest is identified, and a corresponding platform-specific asset is delivered. In some embodiments, the platform-specific assets were previously configured, for example, when the logical instance of interest was generated, and the appropriate mobile operating platform asset is selected based on the mobile operating platform of the device indicated in the received callback. In some embodiments, upon receiving the type of mobile operating platform of the device on which an asset is to be installed, an asset formatted in a manner appropriate to the type of mobile operating platform is generated on demand and provided to the device.

At 914, status information associated with the installation of the digital wallet asset is received. In various embodiments, the status information includes an indication of whether the installation was successful, a device identifier representing the device on which the digital wallet asset was installed, as well as the instance identifier (e.g., serial number) of the logical instance from which the installed asset was derived. In some embodiments, the status information is received from the device. In some embodiments, the status information received from a third party messaging platform. As installations of assets derived from the same logical instance may be performed on multiple discrete devices, multiple sets of status information may be received, with multiple device identifiers (e.g., device tokens) accompanied with the same instance identifier (e.g., one-to-many mapping between instance identifiers and device identifiers).

At 916, a digital wallet asset installation is registered. In some embodiments, a digital wallet installation is associated with the digital wallet asset instance from which the installed asset was derived. In some embodiments, an instance identifier is mapped (e.g., via entity mapping engine 236 of FIG. 2) to one or more device identifiers representing the discrete devices on which assets derived from the instance indicated by the instance identifier were installed. The combination of instance identifier and device identifier can be used to locate an asset installation. In some embodiments, given the mapping between an asset instance and one or more asset installations, metadata tags associated with the digital wallet asset instance can also be associated with/mapped to the installations (e.g., device identifier) as well.

Updating Digital Wallet Assets

Rule-driven asset installation updating is described below. In some embodiments, information/events that are observed can be evaluated according to rules in order to infer and decide when an asset installation should be updated. Various types of information from a variety of sources can be observed, which can influence the actions and workflows taken with respect to digital wallet assets.

Figure 10:
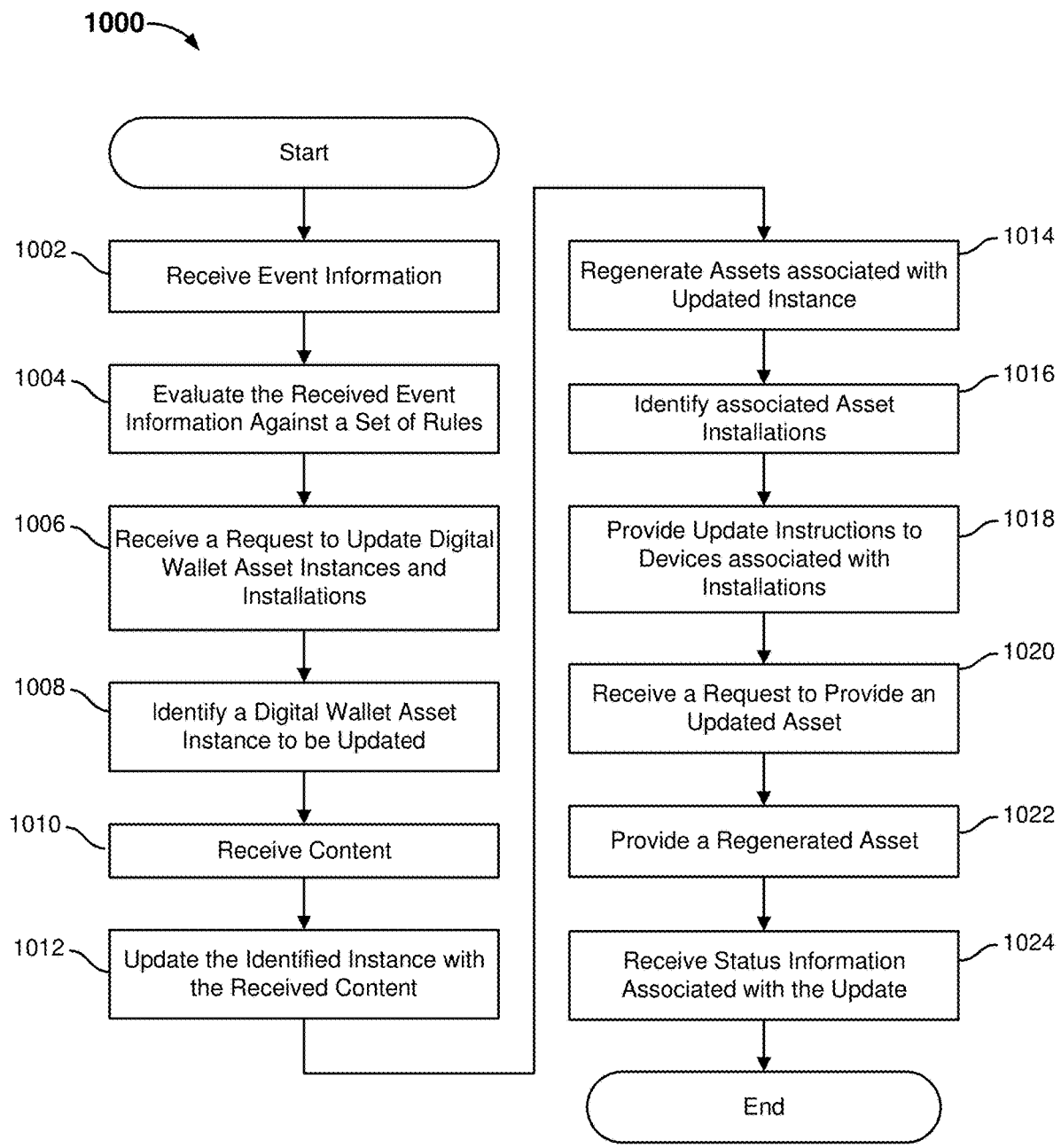
FIG. 10 is a flow diagram illustrating an embodiment of a process for updating digital wallet asset installations.

FIG. 10 is a flow diagram illustrating an embodiment of a process for updating digital wallet asset installations. In some embodiments, process 1000 of FIG. 10 is executed by event listening engine 224, rule engine 226, and update engine 238 of FIG. 2. The process begins at 1002 when event information is received. In some embodiments, the event information is received via event listening engine 224 of FIG. 2. In some embodiments the event information includes information associated with an event that is potentially related, either directly or indirectly, with an asset installation and/or asset instance. Various types of event information can be received that originate from a variety of sources, such as mobile devices, $3^{rd}$ party platforms/services, etc. In some embodiments, rather than receiving event information, event information is fetched from a source, for example, as part of a nightly batch process. In some embodiments, the event information includes inferential data that can be used to influence the updating of an asset instance and corresponding asset installations derived from the asset instance to be updated.

In some embodiments, the event information includes information collected by an application installed on a mobile device. The application installation can be registered with an asset management platform and be configured to periodically transmit collected device information to the asset management platform. In some embodiments, an application installation is linked with a device identifier representing the device on which the application is installed, and the mapping (e.g., application installation identifier to device identifier) is stored on the management platform. In some embodiments, an application installation and an asset installation can also be linked. For example, if both the application and asset are provided by the same entity (e.g., Acme Airlines) and are installed on the same device, then the two may be associated with the same parent cryptography key, and thus the application installation and asset installation can be associated with each other via the cryptography. The application and asset installations can also be linked if they share an association to a common device identifier (e.g., indicating that the application and asset are installed on the same device).

Received event information collected by an application installation can include device location event information. For example, if a mobile device user has opted into location tracking/collection services on the installed application, location information pertaining to the mobile device, such as latitude/longitude information, timestamp information (e.g., indicating the time at which a latitude/longitude was collected), precision information (e.g., precision score indicating the precision of the location information), the source of the location information (e.g., GPS, WiFi, cell tower, etc.) can be collected by the device and transmitted as a device location event.

In some embodiments, the event information is associated with an event involving an asset installation. The event can involve processing of an asset installation or its contents by a $3^{rd}$ party service that is configured to report the processing event to a digital wallet asset management platform (e.g., via an API call). For example, suppose Alice has a gift card with a coffee shop. When Alice buys a cup of coffee using the card, the point of sale system will perform a lookup of Alice's gift card using the Quick Response code (QR code) embedded in her gift card in order to debit the amount of the coffee purchase from her balance. Alice's digital gift card can then be updated to reflect the new balance. The point of sale system/platform can communicate a new event to the asset management platform, which includes information indicating that Alice's digital gift card balance has been updated and that her digital wallet asset installation should be updated to reflect the new balance. The event information can include an instance identifier (e.g. serial number) of Alice's gift card, a device identifier of the device on which the gift card was installed, and the new value of the balance. The event can then be detected by the asset management platform, and the process of updating Alice's gift card asset can be initiated.

As another example, suppose that the coffee shop that Alice frequents also has a promotion in which they give out a free song of the week. If Alice redeems her digital coupon for the free song, an event can be transmitted that the digital coupon has been redeemed. A rule can be defined such that when a song of the week redemption event is detected, a deletion workflow can be initiated to remove the digital coupon from Alice's digital wallet.

In some embodiments, event information can be received from a $3^{rd}$ party service that may be indirectly related to an asset installation in order to cause updating of asset installations. For example, flight status information can be received from a customer such as Acme Airlines. The flight status information can include information about delays associated with various Acme Airlines flights. Acme Airlines can define a rule that evaluates the delays for the flights, and if a delay exceeds a time window, for example, 30 minutes, the rule can trigger the creation of an airport voucher that is sent to all passengers of the delayed flight.

In the example scenarios above, observed information and events have been used to infer that an asset installation should be updated and influence the taking of an action/asset management workflow. In some embodiments, instead of rule-driven updating, the updating process is triggered in response to an explicit request to update a digital wallet asset. For example, a customer of the asset management platform can make a direct API call to request that all installations associated with a particular metadata tag and template identifier are to be updated with content specified in the request.

At 1004, the received event information is evaluated against a set of rules. The rules can be defined, for example by a customer of an asset management platform, via a user interface such as digital wallet asset configuration interface engine 212 of FIG. 2. In some embodiments, the evaluation includes detecting that an observed event matches a set of rule criteria. The criteria specified in a rule set can include spatial dimensionality criteria, temporal dimensionality criteria, as well as metadata tag criteria. For example, given a latitude/longitude included in the received event information (e.g., location event information), it can be detected whether a device was within a particular proximity to a location defined in the rule criteria. Additionally, it can be determined whether a device (identified by its corresponding device identifier) is associated with tags that match tag criteria of a rule set. For example, a device identifier may be included in the received event information, and metadata tags mapped to the device identifier can be retrieved to determine whether any of the returned tags match the metadata tags specified by a rule set.

In some embodiments, rules can be defined with respect to particular types of parameters, and evaluation of the rules can include performing logical operations, such as mathematical operations on parameters/information received in events. For example, as described above, Acme Airlines can define a rule(s)/ruleset(s) that evaluate incoming flight information by comparing the delay time of a flight against a threshold delay defined as rule criteria. If a received delay time in the flight status event information exceeds the threshold, then asset management actions/workflows can be triggered, such as updating the boarding passes of all passengers associated with the delayed flight to reflect the new delayed time, as well as the generation of digital airport voucher instances/assets to be sent to the passengers as compensation.

At 1006, a request to update digital wallet asset instances and installations is received. For example, an update workflow can be initiated/triggered in response to the evaluation of an observed event against rulesets as described above. In some embodiments, explicit requests are received, for example, via an API call. The request can include information used to identify/locate asset instances and installations to be updated, such as device identifiers, metadata tags, instance identifiers, etc. The request can also include instructions for how asset instances and installations are to be updated, including information such as updated content (e.g., media, key value pairs, text, updated tags, etc.)

At 1008, a digital wallet asset logical instance to be updated is identified. In some embodiments, prior to updating asset installations, the logical instance from which an installed asset is derived is updated. The logical instance can be identified directly, for example, by an instance identifier that is received as part of an update request. In some embodiments, template identifiers and metadata tags are received. For example, in the example where an Acme Airlines flight is delayed, the delay evaluation rule can be configured such that if delay criteria of the rule are met, the flight number that is delayed as well as the boarding pass template identifier are used to locate logical instances to be updated. Thus, all instances of the boarding pass template (identified by the received template identifier) that are also tagged with the flight number of the delayed flight can be located for updating.

In some embodiments, device identifiers can also be used to identify/locate instances to be updated. For example, a device identifier can be sent with observed/received location event information, and along with a template identifier, an appropriate logical instance that is mapped to the device identifier and created from the template identified by the template identifier can be located. In some embodiments, the template identifier is used because a single device may be associated with multiple assets (e.g., one device can have many assets installed). Any combination of metadata tags, device identifiers, instance identifiers, template identifiers, etc. can be used to locate instances to be updated.

At 1010, updated content is received. The updated content can include media, key value pairs, text, updated tags, etc. The updated content values and how the content values should be applied when updating digital wallet assets can be specified as the output of an evaluation of an event against a ruleset when configuring/defining the ruleset. In the example where an Acme Airlines flight is delayed, boarding pass departure times can be updated by adding the value of the delay.

At 1012, the identified logical instance is updated with the received updated content. For example, the design (e.g., media, text, headers, footers, etc.) of the identified logical instance(s) can be updated, and updated key values (e.g., data values) merged to their corresponding keys. At 1014, platform-specific assets associated with the updated logical instance are regenerated. The regenerated assets are stored, for example, to asset storage.

At 1016, asset installation(s) to be updated that are associated with the updated logical instance are identified. In some embodiments, the installations are identified by corresponding device identifiers in combination with a received instance identifier. The device identifiers can be returned in response to a query to locate asset installations via tags and location information. For example, a query including relevant location information, time information, metadata tags, etc. can be used to query backend databases such as tag engine 244 and location storage engine 246 in order to locate and return relevant device identifiers that satisfy the query. In some embodiments, the query includes Boolean logic operators and predicates as well. For example, the a query can be made that requests for devices that have been in either San Francisco within the last three month OR New York within the last six months AND that are tagged as VIP gym members. The returned device identifiers can be filtered against the identifier of the instance-to-be-updated to create a refined list of device identifiers that are associated with the corresponding asset installations.

At 1018, update instruction(s) are provided to the identified device(s). In some embodiments, the update instruction, when processed by the device, causes the device to transmit a call back request to an asset management platform in order to fetch and download the newly regenerated asset and update the device's asset installation. In some embodiments, the update instruction is provided in the form of a push notification or any other appropriate distribution channel. In some embodiments, the distribution channel is dependent upon the mobile operating platform (e.g., iOS, Android, Blackberry, Windows Phone, Mozilla, etc.) of the device whose asset installation is being updated. At 1020, a request to provide an updated digital wallet asset is received, for example, from the device. In response at 1022, a regenerated asset that is formatted in a manner corresponding to the mobile operating platform of the device is provided (e.g., retrieved from asset storage and made available for download to the device). At 1024, status information associated with updating is received, for example, indicating whether updating of an asset installation was successful.

In some embodiments, updating an asset installation comprises deleting the asset installation. As one example scenario, suppose that Alice has an Acme Airlines application on her smartphone and has opted into location services. After landing and getting off her flight, her boarding pass can be automatically deleted when the Acme Airlines application indicates via a device location event that Alice has safely arrived at her flight destination.

In some embodiments, as part of the updating process, temporal asset drift can be accounted for. As described above, in some cases, a digital wallet asset (that is stored and prepared on an asset management backend) may not have been installed on any mobile devices, and the updating process is ended with the refreshing of the logical instance and corresponding backend-stored assets. This scenario, however, can lead to asset version drift (e.g., temporal drift as assets are updated over time). For example, Alice's gym has generated an instance of her membership card, and sent an email to Alice with a link to the digital membership card. However, Alice has not yet clicked on the link, and therefore does not yet have the membership card installed on her phone. In the meantime, the gym has decided that an updated version of Alice's membership card should instead be delivered, and the gym makes an update call to the asset management platform to update Alice's membership card instance as well as generate a newly updated version of the membership card asset stored on the backend. The update process can recognize that there does not yet exist an installation of the membership card asset (e.g., not device identifier mapped to logical instance), and when Alice eventually clicks on the installation link in the email, the update workflow can perform version control/accounting of temporal asset drift and deliver the newly updated version of her membership card rather than the previous version, which may, in some embodiments, be stored for archival purposes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method comprising:
   receiving, by a digital pass management platform, a template designed by a platform customer;
   delivering, by the digital pass management platform on behalf of the platform customer, digital passes to user devices of users of the platform customer, the digital passes generated based on the template;
   storing a mapping between device identifiers of the user devices on which digital passes are installed and user identifiers of the users of the platform customer, wherein a particular installed digital pass is associated with metadata specific to a particular user device, and the metadata is generated from usage associated with the particular installed digital pass;
   receiving a request from the platform customer to retrieve the metadata of the particular installed digital pass associated with the particular user device;
   retrieving the metadata of the digital pass from the particular user device; and
   transmitting a message to a particular user mapped to the particular user device, the message generated based on the metadata retrieved.

2. The computer-implemented method of claim 1, wherein the metadata is transmitted from a point of sale platform.

3. The computer-implemented method of claim 1, wherein the metadata is transmitted from an issuer of the installed digital pass.

4. The computer-implemented method of claim 1, wherein the metadata is transmitted from the particular user device.

5. The computer-implemented method of claim 1, wherein the metadata includes device location information.

6. The computer-implemented method of claim 1, wherein the message is a personalized message generated based on the metadata of the digital pass retrieved.

7. The computer-implemented method of claim 1, wherein the message includes text that is identified by one or more fields in the digital pass.

8. The computer-implemented method of claim 1, wherein the message includes a request for updating the digital pass.

9. A system comprising:
   one or more processors;
   memory for storing computer code comprising instructions, the instructions, when executed by the one or more processors, cause the one or more processor to:
   receive, by a digital pass management platform, a template designed by a platform customer;
   deliver, by the digital pass management platform on behalf of the platform customer, digital passes to user devices of users of the platform customer, the digital passes generated based on the template;
   store a mapping between device identifiers of the user devices on which digital passes are installed and user identifiers of the users of the platform customer, wherein a particular installed digital pass is associated with metadata specific to a particular user device, and the metadata is generated from usage associated with the particular installed digital pass;
   receive a request from the platform customer to retrieve the metadata of the particular installed digital pass associated with the particular user device;
   retrieve the metadata of the digital pass from the particular user device; and
   transmit a message to a particular user mapped to the particular user device, the message generated based on the metadata retrieved.

10. The system of claim 9, wherein the metadata is transmitted from a point of sale platform.

11. The system of claim 9, wherein the metadata is transmitted from an issuer of the installed digital pass.

12. The system of claim 9, wherein the metadata is transmitted from the particular user device.

13. The system of claim 9, wherein the metadata includes device location information.

14. The system of claim 9, wherein the message is a personalized message generated based on the metadata of the digital pass retrieved.

15. The system of claim 9, wherein the message includes text that is identified by one or more fields in the digital pass.

16. The system of claim 9, wherein the message includes a request for updating the digital pass.

17. A non-transitory computer readable medium for storing computer code comprising instructions, the instructions, when executed by one or more processors, cause the one or more processor to:
   receive, by a digital pass management platform, a template designed by a platform customer;
   deliver, by the digital pass management platform on behalf of the platform customer, digital passes to user devices of users of the platform customer, the digital passes generated based on the template;
   store a mapping between device identifiers of the user devices on which digital passes are installed and user identifiers of the users of the platform customer, wherein a particular installed digital pass is associated with metadata specific to a particular user device, and the metadata is generated from usage associated with the particular installed digital pass;

receive a request from the platform customer to retrieve the metadata of the particular installed digital pass associated with the particular user device;

retrieve the metadata of the digital pass from the particular user device; and transmit a message to a particular user mapped to the particular user device, the message generated based on the metadata retrieved.

18. The non-transitory computer readable medium of claim 17, wherein the message is a personalized message generated based on the metadata of the digital pass retrieved.

19. The non-transitory computer readable medium of claim 17, wherein the message includes text that is identified by one or more fields in the digital pass.

20. The non-transitory computer readable medium of claim 17, wherein the message includes a request for updating the digital pass.

* * * * *